United States Patent
Yang et al.

(10) Patent No.: US 11,160,109 B2
(45) Date of Patent: Oct. 26, 2021

(54) CLEAR CHANNEL ASSESSMENT (CCA) FOR A WIDE BANDWIDTH CHANNEL

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 17 days.

(21) Appl. No.: 16/675,824

(22) Filed: Nov. 6, 2019

(65) Prior Publication Data
US 2020/0178299 A1     Jun. 4, 2020

Related U.S. Application Data

(60) Provisional application No. 62/774,122, filed on Nov. 30, 2018.

(51) Int. Cl.
| | | |
|---|---|---|
| *H04W 4/00* | (2018.01) | |
| *H04W 74/08* | (2009.01) | |
| *H04W 84/12* | (2009.01) | |

(52) U.S. Cl.
CPC ........ *H04W 74/0808* (2013.01); *H04W 84/12* (2013.01)

(58) Field of Classification Search
CPC .......................... H04W 74/0808; H04W 84/12
See application file for complete search history.

(56) References Cited

U.S. PATENT DOCUMENTS

| | | | | |
|---|---|---|---|---|
| 2012/0182886 A1* | 7/2012 | Ong | ................... | H04W 74/0816 370/252 |
| 2012/0213204 A1* | 8/2012 | Noh | ...................... | H04W 40/02 370/331 |
| 2013/0176954 A1* | 7/2013 | Lv | ......................... | H04W 74/04 370/329 |
| 2014/0355537 A1* | 12/2014 | Seok | ..................... | H04W 74/00 370/329 |
| 2015/0373685 A1* | 12/2015 | Seok | ................. | H04W 72/0406 370/329 |
| 2016/0081010 A1* | 3/2016 | Seok | ................. | H04W 74/0808 370/329 |
| 2016/0227489 A1* | 8/2016 | Oteri | ..................... | H04W 52/12 |

\* cited by examiner

*Primary Examiner* — Siren Wei
(74) *Attorney, Agent, or Firm* — DeLizio Law, PLLC

(57) ABSTRACT

This disclosure provides methods, devices, systems, and computer programs encoded on storage media, for clear channel assessment (CCA) for a wide bandwidth channel. For example, a wide bandwidth channel may have a bandwidth that is greater than 160 MHz bandwidth. An example wide bandwidth channel has a 320 MHz bandwidth. The CCA techniques include detection thresholds that may be used for wide bandwidth channels. In some implementations, a CCA process may be extended to include assessments of extended portions of a wide bandwidth channel (such as a tertiary 80 MHz bandwidth channel and a quaternary 80 MHz bandwidth channel). In some implementations, a CCA process may be extended to use an assessment of a secondary channel of the wide bandwidth channel that has a 160 MHz bandwidth.

22 Claims, 14 Drawing Sheets

1210

| CCA THRESHOLD FOR PRIMARY CHANNEL SIZES | CCA THRESHOLD |
|---|---|
| ANY SIGNAL IN PRIMARY 20MHZ | -62 DBM |
| DETECTION OF THE START OF WLAN SIGNAL IN PRIMARY 20MHZ | -82 DBM |
| DETECTION OF THE START OF WLAN SIGNAL IN PRIMARY 40MHZ | -79 DBM |
| DETECTION OF THE START OF WLAN SIGNAL IN PRIMARY 80MHZ | -76 DBM |
| DETECTION OF THE START OF WLAN SIGNAL IN PRIMARY 160MHZ | -73 DBM |
| DETECTION OF THE START OF WLAN SIGNAL IN 240MHZ, OR 160+80, 80+160, 3X80 MHZ | -71 DBM |
| DETECTION OF THE START OF WLAN SIGNAL IN 320MHZ, OR 160+160MHZ | -70 DBM |

| CCA THRESHOLDS FOR SECONDARY CHANNELS | WLAN SIGNAL | NON-WLAN SIGNAL |
|---|---|---|
| ANY 20 MHZ SUBCHANNEL(S) NOT CONTAINING PRIMARY20 | MAX( -72 DBM, OBSS_PD ) | -62 DBM |
| ANY 40 MHZ SUBCHANNEL(S) NOT CONTAINING PRIMARY20 | MAX( -72 DBM, OBSS_PD+3 ) | -59 DBM |
| SECONDARY/TERTIARY/QUATERNARY80 | MAX( -69 DBM, OBSS_PD+6 ) | -56 DBM |
| SECONDARY160 | MAX( -66 DBM, OBSS_PD+9 ) | -53 DBM |

*Figure 12B*

CLEAR CHANNEL ASSESSMENT (CCA) FOR A WIDE BANDWIDTH CHANNEL

CROSS-REFERENCE TO RELATED APPLICATIONS

This patent application claims priority to U.S. Provisional Patent Application No. 62/774,122 filed Nov. 30, 2018, entitled "CLEAR CHANNEL ASSESSMENT (CCA) FOR A WIDE BANDWIDTH CHANNEL," and assigned to the assignee hereof. The disclosure of the prior application is considered part of and is incorporated by reference in this patent application.

TECHNICAL FIELD

This disclosure relates generally to wireless communications, and more specifically, to clear channel assessment (CCA) by an apparatus of a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

When an apparatus (such as an AP or a STA) has data to transmit via a shared wireless communication medium, the apparatus may perform a clear channel assessment (CCA) to determine if a wireless communication channel is idle or busy. A CCA (also referred to as a "CCA check") refers to the use of carrier sensing and energy detection to determine an idle or busy state of the wireless communication channel. Typically, a CCA is performed by a physical (PHY) layer of a transmitter that informs a media access control (MAC) layer of the transmitter whether the wireless communication channel is available for use by the apparatus. Current CCA techniques may be inadequate for a wide bandwidth channel.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. In some implementations, the method may include performing, by a physical (PHY) layer of the wireless communication device, a plurality of clear channel assessment (CCA) checks to determine a busy or idle status of a corresponding plurality of channels that make up a wide bandwidth channel having a bandwidth greater than 160 MHz. The plurality of channels may include at least one primary channel and at least one secondary channel that collectively span the bandwidth of the wide bandwidth channel. The method may include preparing, by the PHY layer, a CCA indication report that indicates a busy status or idle status of the wide bandwidth channel based, at least in part, on the plurality of CCA checks. The method may include providing, by the PHY layer, the CCA indication report to a media access control (MAC) layer of the wireless communication device. The MAC layer may be configured to refrain from communicating on the wide bandwidth channel if the CCA indication report indicates the busy status of the wide bandwidth channel.

In some implementations, the methods and wireless communication devices may be configured to segment the wide bandwidth channel into the plurality of channels. The plurality of channels may be segmented to include a primary 20 MHz bandwidth channel, a secondary 20 MHz bandwidth channel, a secondary 40 MHz bandwidth channel, a secondary 80 MHz bandwidth channel, a tertiary 80 MHz bandwidth channel and a quaternary 80 MHz bandwidth channel.

In some implementations, the methods and wireless communication devices may be configured to sequentially perform CCA checks on the primary 20 MHz bandwidth channel, the secondary 20 MHz bandwidth channel, the secondary 40 MHz bandwidth channel, the secondary 80 MHz bandwidth channel, the tertiary 80 MHz bandwidth channel and the quaternary 80 MHz bandwidth channel. In some implementations, preparing the CCA indication report may include adding the busy status to the CCA indication report upon detecting a first busy instance in one of the plurality of CCA checks. In some implementations, the CCA indication report may be provided after the first busy instance.

In some implementations, the methods and wireless communication devices may be configured to sequentially perform CCA checks on the primary 20 MHz bandwidth channel, the secondary 20 MHz bandwidth channel, the secondary 40 MHz bandwidth channel and concurrently performing CCA checks on the secondary 80 MHz bandwidth channel, the tertiary 80 MHz bandwidth channel and the quaternary 80 MHz bandwidth channel. In some implementations, preparing the CCA indication report may include adding the busy status to the CCA indication report upon detecting a first busy instance in one of the primary 20 MHz bandwidth channel, the secondary 20 MHz bandwidth channel, or the secondary 40 MHz bandwidth channel and adding the busy status to the indication report upon detecting a busy instance on any of the secondary 80 MHz bandwidth channel, the tertiary 80 MHz bandwidth channel and the quaternary 80 MHz bandwidth channel.

In some implementations, the methods and wireless communication devices may be configured to segment the wide bandwidth channel into the plurality of channels. The plurality of channels may be segmented to include a primary 20 MHz bandwidth channel, a secondary 20 MHz bandwidth channel, a secondary 40 MHz bandwidth channel, a secondary 80 MHz bandwidth channel, and a secondary 160 MHz bandwidth channel.

In some implementations, the plurality of channels may include a primary 20 MHz bandwidth channel and multiple secondary 20 MHz bandwidth channels that collectively span the wide bandwidth channel.

In some implementations, the methods and wireless communication devices may be configured to segment the wide bandwidth channel into the plurality of channels such that the plurality of channels includes a primary 20 MHz bandwidth channel, a secondary 20 MHz bandwidth channel, a secondary 40 MHz bandwidth channel, a secondary 80 MHz bandwidth channel, and a secondary 160 MHz bandwidth channel. In some implementations, the methods and wireless communication devices may be configured to perform CCA checks for each 20 MHz bandwidth of the primary 20 MHz bandwidth channel, the secondary 20 MHz bandwidth channel, the secondary 40 MHz bandwidth channel, the secondary 80 MHz bandwidth channel, and the secondary 160 MHz bandwidth channel. In some implementations, the methods and wireless communication devices may be configured to perform CCA checks for each 40 MHz bandwidth of the secondary 40 MHz bandwidth channel, the secondary 80 MHz bandwidth channel, and the secondary 160 MHz bandwidth channel. In some implementations, the methods and wireless communication devices may be configured to perform CCA checks for each 80 MHz bandwidth of the secondary 80 MHz bandwidth channel and the secondary 160 MHz bandwidth channel. In some implementations, the methods and wireless communication devices may be configured to perform a CCA check for each 160 MHz bandwidth of the secondary 160 MHz bandwidth channel.

In some implementations, the methods and wireless communication devices may be configured to segment the wide bandwidth channel into the plurality of channels such that plurality of channels includes a primary 20 MHz bandwidth channel, a secondary 20 MHz bandwidth channel, a secondary 40 MHz bandwidth channel, a secondary 80 MHz bandwidth channel, a tertiary 80 MHz bandwidth channel, and a quaternary 80 MHz bandwidth channel. In some implementations, the methods and wireless communication devices may be configured to perform CCA checks for each 20 MHz bandwidth of the primary 20 MHz bandwidth channel, the secondary 20 MHz bandwidth channel, the secondary 40 MHz bandwidth channel, and the secondary 80 MHz bandwidth channel. In some implementations, the methods and wireless communication devices may be configured to perform CCA checks for each 40 MHz bandwidth of the secondary 40 MHz bandwidth channel and the secondary 80 MHz bandwidth channel. In some implementations, the methods and wireless communication devices may be configured to perform CCA checks for each 80 MHz bandwidth of the secondary 80 MHz. In some implementations, the methods and wireless communication devices may be configured to perform a CCA check for each 20 MHz, 40 MHz and 80 MHz bandwidth of the tertiary 80 MHz bandwidth channel and the quaternary 80 MHz bandwidth channel.

In some implementations, the methods and wireless communication devices may be configured to segment the wide bandwidth channel into the plurality of channels such that the plurality of channels includes a primary 160 MHz bandwidth channel and a secondary 160 MHz bandwidth channel. In some implementations, the methods and wireless communication devices may be configured to perform CCA checks for each 20 MHz bandwidth of the primary 160 MHz bandwidth channel. In some implementations, the methods and wireless communication devices may be configured to perform CCA checks for each 80 MHz bandwidth of the secondary 160 MHz.

In some implementations, the methods and wireless communication devices may be configured to segment the wide bandwidth channel into a first half portion and a second half portion. In some implementations, the methods and wireless communication devices may be configured to segment the first half portion of the wide bandwidth channel into a first plurality of channels such that the first plurality of channels includes a primary 20 MHz bandwidth channel, a secondary 20 MHz bandwidth channel, a secondary 40 MHz bandwidth channel, and a secondary 80 MHz bandwidth channel.

In some implementations, the methods and wireless communication devices may be configured to segment the second half portion of the wide bandwidth channel into a second plurality of channels such that the second plurality of channels includes a primary 20 MHz bandwidth channel, a secondary 20 MHz bandwidth channel, a secondary 40 MHz bandwidth channel, and a secondary 80 MHz bandwidth channel. In some implementations, the methods and wireless communication devices may be configured to perform CCA checks for each of the first plurality of channels and the second plurality of channels.

In some implementations, the CCA indication report indicates the wide bandwidth channel is busy if any of the plurality of CCA checks result in a detection of energy greater than detection threshold.

In some implementations, the detection threshold is different for the at least one primary channel and the at least one secondary channel. The respective detection threshold may be based on a bandwidth size of the at least one primary channel and the at least one secondary channel.

In some implementations, the detection threshold for each larger secondary channel of the at least one secondary channel is greater than detection thresholds for each smaller secondary channel.

In some implementations, the CCA indication report includes the busy or idle status of the wide bandwidth channel and one or more indicators regarding busy instances for ones of the plurality of channels.

In some implementations, the CCA indication report includes at least one indicator regarding a first CCA check for a secondary 160 MHz channel.

In some implementations, the methods and wireless communication devices may be configured to segment the wide bandwidth channel into a primary channel and a secondary channel. In some implementations, the methods and wireless communication devices may be configured to recursively segment the primary channel into a smaller primary channel and a smaller secondary channel until a smallest primary channel has a 20 MHz bandwidth. In some implementations, the methods and wireless communication devices may be configured to perform CCA checks on each primary channel and each secondary channel.

In some implementations, the methods and wireless communication devices may be configured to perform CCA checks for a first portion of the wide bandwidth channel, the first portion including up to 160 MHz bandwidth of the wide bandwidth channel. In some implementations, the methods and wireless communication devices may be configured to determine a tertiary channel of the wide bandwidth channel within a second portion of the wide bandwidth channel. In some implementations, the methods and wireless communication devices may be configured to perform one or more further CCA checks for the tertiary channel.

In some implementations, the methods and wireless communication devices may be configured to determine a quaternary channel, different from the tertiary channel, of the wide bandwidth channel within the second portion. In some implementations, the methods and wireless communication devices may be configured to perform one or more further CCA checks for the quaternary channel.

In some implementations, the methods and wireless communication devices may be configured to concurrently perform the one or more further CCA checks for the tertiary channel and the quaternary channel.

Another innovative aspect of the subject matter described in this disclosure can be implemented in a wireless communication device. In some implementations, the wireless communication device includes at least one interface and at least one processor configured to perform any one of the above referenced methods.

Another innovative aspect of the subject matter described in this disclosure can be implemented in the wireless communication device having at least one memory communicatively coupled with the at least one processor and storing processor-readable code that, when executed by the at least one processor, causes the wireless communication device to implement any one of the above referenced methods.

Another innovative aspect of the subject matter described in this disclosure can be implemented a mobile station including the wireless communication device and one or more transceivers coupled to the wireless communication device to communicate with a WLAN. The mobile station may include one or more antennas coupled to the one or more transceivers to wirelessly transmit signals output from the transceivers and to wirelessly receive signals for input into the transceivers. The mobile station may include a housing that encompasses the wireless communication device, the one or more transceivers and at least a portion of the one or more antennas.

Another innovative aspect of the subject matter described in this disclosure can be implemented in an apparatus having at least one processor and at least one memory communicatively coupled with the at least one processor of a wireless communication device and storing processor-readable code that, when executed by the at least one processor, causes the wireless communication device to implement any one of the above referenced methods.

Another innovative aspect of the subject matter described in this disclosure can be implemented in a tangible computer-readable storage medium comprising non-transitory processor-executable code which, when executed by at least one processor of a wireless communication device, causes the wireless communication device to implement any one of the above referenced methods.

Another innovative aspect of the subject matter described in this disclosure can be implemented a system having means for implementing any one of the above referenced methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12A shows a chart of CCA thresholds when checking a primary channel according to some implementations.

FIG. 12B shows a chart of CCA thresholds when checking a secondary channel, tertiary channel, or quaternary channel according to some implementations.

Like reference numbers and designations in the various drawings indicate like elements.

DETAILED DESCRIPTION

Figure 1:
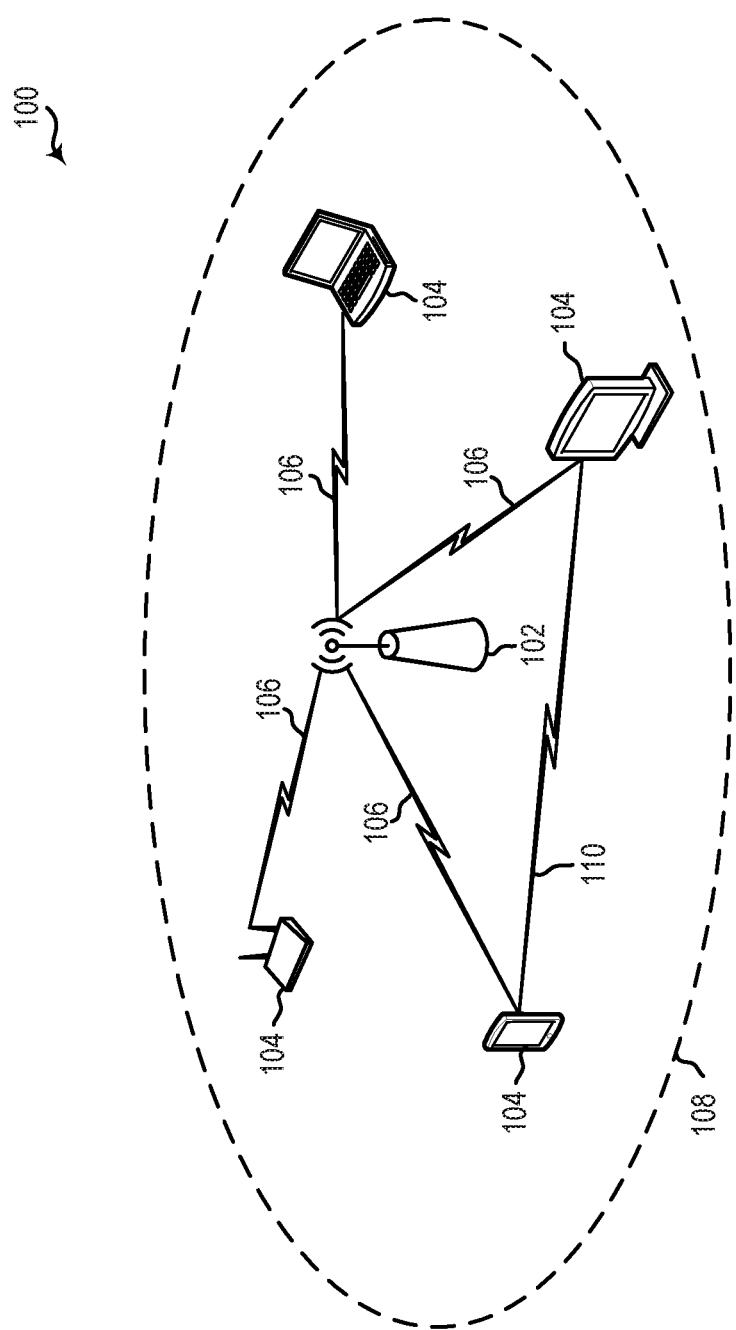
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

This disclosure provides methods, devices, systems, and computer programs encoded on storage media, for clear channel assessment (CCA) for a wide bandwidth channel. CCA may be performed on a wide bandwidth channel to determine if the channel is idle (available for use by a transmitter) or busy (currently unavailable). Typically, a CCA is performed by a physical (PHY) layer of a transmitter that informs a media access control (MAC) layer of the transmitter whether the wireless communication channel is available for use by the apparatus. Current CCA techniques may be inadequate for a wide bandwidth channel.

Various implementations relate generally to CCA techniques for a wide bandwidth channel. For example, a wide bandwidth channel may refer to a bonded channel having a bandwidth that is greater than 160 MHz, such as, for example, a bandwidth of 240 MHz or 320 MHz, among other examples. In some implementations, a wireless communication device may perform CCA checks on portions of the wide bandwidth channel to determine whether the wide bandwidth channel is available or busy. For example, the wireless communication device may preform CCA checks on primary and secondary bandwidth channels that represent portions (or "subchannels") of the wide bandwidth channel. In some implementations, the portions may be recursively divided into different portions of the same or different bandwidths. Some implementations further relate to various signal detection thresholds that may be used for different portions of a wide bandwidth channel during a CCA process.

In some implementations, a wireless communication device may perform a CCA process for a primary 80 MHz bandwidth channel and a secondary 80 MHz bandwidth channel of a wideband channel to determine whether a 160 MHz bandwidth portion of the wide bandwidth channel is available or busy. The CCA process may be extended to perform assessments of extended portions of the wide bandwidth channel, such as a tertiary 80 MHz bandwidth channel and a quaternary 80 MHz bandwidth channel. The wireless communication device may generate a PHY layer CCA indication as a report from a PHY layer to the MAC layer. The PHY layer CCA indication may include one or more indicators to indicate the busy or idle status of the wide bandwidth channel based on assessments of the various portions of the wide bandwidth channel. In some implementations, for a 320 MHz bonded channel, the CCA indication may include indicators for a primary 80 MHz bandwidth channel, a secondary 80 MHz bandwidth channel, a tertiary 80 MHz bandwidth channel, and a quaternary 80 MHz bandwidth channel.

In some implementations, a wireless communication device may perform a CCA process for a primary 80 MHz bandwidth channel and a secondary 80 MHz bandwidth channel of a wideband channel to determine whether a primary 160 MHz bandwidth channel of the wide bandwidth channel is available or busy. The CCA process may be extended to perform an assessment of a secondary 160 MHz bandwidth channel of the wide bandwidth channel. For example, the PHY layer CCA indication to the MAC layer may include an indicator to indicate the busy or idle status of the primary 160 MHz bandwidth channel, the secondary 160 MHz bandwidth channel, or both.

In some implementations, a wireless communication device may perform CCA process that includes a granular check of multiple portions of a wide bandwidth channel. For example, a PHY layer may provide CCA indications (such as bits in a "per20bitmap") for each 20 MHz portion of the wide bandwidth channel. The per20bitmap may be useful, for example, in punctured communications where transmissions on particular 20 MHz portions of the wide bandwidth channel may be avoided, for example, due to the presence of another interfering or incumbent signal. The per20bitmap may be extended to include indicators for extended portions of the wide bandwidth channel.

In some implementations, a wireless communication device may perform a CCA process that includes a combination of more-granular checks (such as per 20 MHz checks) for a first portion of a wide bandwidth channel and less-granular checks (such as per 80 MHz checks) for a second portion of the wide bandwidth channel. For example, the wireless communication device may perform per-20 MHz checks for a first 160 MHz portion of the wide bandwidth channel and may perform per-80 MHz checks for a second 160 MHz portion of the wide bandwidth channel.

In some implementations, a wireless communication device may perform a CCA process that includes parallel checks for different portions of the wide bandwidth channel. For example, the wireless communication device may determine per-80 MHz checks in parallel. For example, for a 320 MHz wide bandwidth channel, the wireless communication device may perform CCA detection for a primary 80 MHz bandwidth channel, a secondary 80 MHz bandwidth channel, a tertiary 80 MHz bandwidth channel, and a quaternary 80 MHz bandwidth channel.

Particular implementations of the subject matter described in this disclosure can be implemented to realize one or more of the following potential advantages. The described techniques may be used to efficiently detect a busy or idle status of a wide bandwidth channel based on CCA checks of portions of the wide bandwidth channel. Additional indicator definitions permit a PHY layer to accurately and precisely indicate the CCA results for various portions of the wide bandwidth channel to a MAC layer. Additionally, some implementations may support puncturing of a wide bandwidth channel by providing separate indicators for portions of the wide bandwidth channel.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish or maintain a respective communication link 106 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a Wi-Fi link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU is equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a Wi-Fi link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective Wi-Fi links 106) according to the IEEE 802.11 family of standards (such as that defined by the IEEE 802.11-2016 specification or amendments thereof including, but not limited to, 802.11ah, 802.11ay, 802.11ax, 802.11az, 802.11ba and 802.11be (which also may be referred to as Extremely High Throughput (EHT))). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer (PHY) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Some APs and STAs support beamforming. Beamforming refers to the focusing of the energy of a transmission in the direction of a target receiver. Beamforming may be used both in a single user context, for example, to improve a signal-to-noise ratio (SNR), as well as in a multi-user (MU) context, for example, to enable MU multiple-input multiple-output (MIMO) transmissions. To perform beamforming, a transmitter, referred to as the beamformer, transmits a signal from multiple antenna elements of an antenna array. The beamformer configures the phase shifts between the signals transmitted from the different antenna elements such that the signals add constructively along particular directions towards the intended receivers, which are referred to as beamformees. The manner in which the beamformer configures the phase shifts depends on channel state information associated with the wireless channels over which the beamformer intends to communicate with the beamformees. To obtain the channel state information, the beamformer may perform a channel sounding procedure with the beamformees. For example, the beamformer may transmit one or more sounding packets to the beamformees. The beamformees may then perform measurements of the channel based on the sounding packets and subsequently provide feedback to the beamformer based on the measurements, for example, in the form of a feedback matrix. The beamformer may then generate a steering matrix for each of the beamformees based on the feedback and use the steering matrix to configure the phase shifts for subsequent transmissions to the beamformees.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz bandwidth channels. As such, these PPDUs are transmitted over a physical channel having a minimum bandwidth of 20 MHz. But larger channels can be formed through channel bonding. For example, PPDUs conforming to the IEEE 802.11n, 802.11ac and 802.11ax standard amendments may be transmitted over physical channels having bandwidths of 40 MHz, 80 MHz, or 160 MHz by bonding together two or more 20 MHz bandwidth channels. Newer technologies may support the use of wide bandwidth channels, for example, physical channels having bandwidths of 240 MHz, 320 MHz or greater.

Each PPDU is a composite structure that includes a PHY preamble and a physical layer convergence protocol (PLCP) service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz bandwidth channels. The format of, coding of, and information provided in the non-legacy portion of the preamble is based on the particular IEEE 802.11 protocol.

Access to the shared wireless medium is governed by a Distributed Coordination Function (DCF). With a DCF, there is no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device must perform a CCA and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium should next become idle. The NAV is reset each time a valid frame is received that is not addressed to the wireless communication device. The NAV effectively serves as a time duration that must elapse before the wireless communication device may contend for access even in the absence of a detected symbol or a detected energy below the relevant threshold.

As described above, the DCF is implemented through the use of time intervals. These time intervals include the slot time (or "slot interval") and the Inter-Frame Space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as the IEEE 802.11 family of standards (such as that defined by the IEEE 802.11-2016 specification or amendments thereof).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder of a Transmit Opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new Transmit Opportunity (TXOP), it randomly selects a new backoff timer duration. The available distribution of the numbers that may be randomly selected for the backoff timer is referred to as the Contention Window (CW). If, when the backoff timer expires, the wireless communication device transmits the PPDU but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer.

APs 102 and STAs 104 can support multi-user (MU) transmissions; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UP) transmissions from corresponding STAs 104 to an AP 102). To support the MU transmissions, the APs 102 and STAs 104 may utilize multi-user orthogonal frequency division multiple access (MU-OFDMA) and multi-user multiple-input, multiple-output (MU-MIMO) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. RUs may be allocated in 2 MHz intervals, and as such, the smallest RU includes 26 tones consisting of 24 data tones and 2 pilot tones. As such, in a 20 MHz bandwidth channel, up to 9 RUs (such as 2 MHz, 26-tone RUs) may be allocated (because some tones are reserved for other purposes). Similarly, in a 160 MHz bandwidth channel, up to 74 RUs may be allocated. Therefore, it may be possible to schedule as many as 74 STAs 104 for MU-OFDMA transmissions. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs) and may assign each AID one or more RUs that can be used to send UL traffic to the AP 102. The AP also may designate one or more random access (RA) RUs that unscheduled STAs 104 may contend for.

Figure 2:
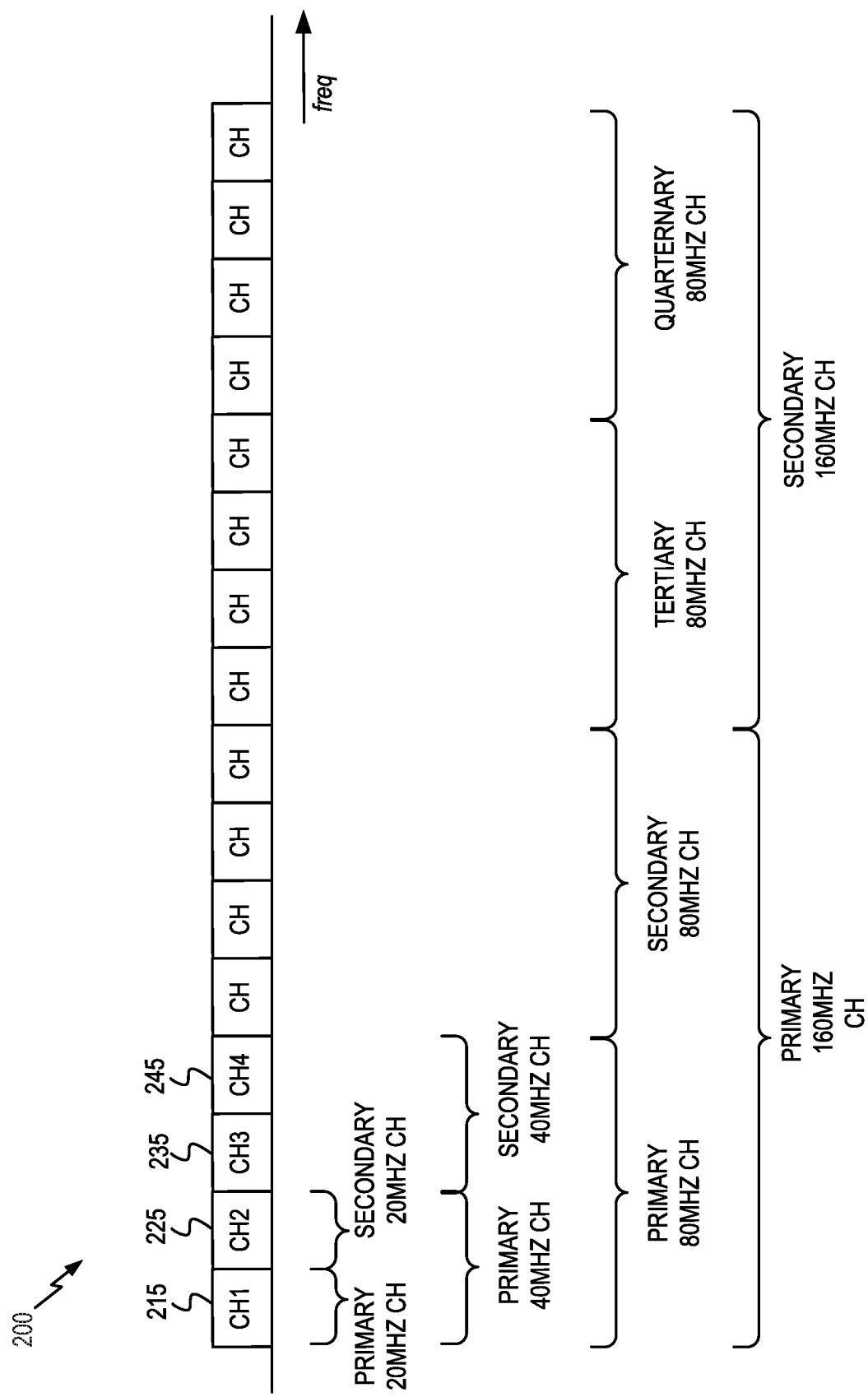
FIG. 2 shows an example wide bandwidth channel.

FIG. 2 shows an example wide bandwidth channel. A frequency band (such as the 2.4 GHz, 5 GHz, or 6 GHz frequency band) may define multiple channels. Each channel may have a uniform channel width (such as 20 MHz). As described above, some WLAN devices are capable of transmitting at higher bandwidths by concurrently using multiple channels (referred to as "channel bonding"). In the example of FIG. 2, a wide bandwidth channel 200 has a 320 MHz total bandwidth resulting from the bonding or aggregation of sixteen smaller 20 MHz bandwidth channels including a first channel 215, a second channel 225, a third channel 235 and a fourth channel 245. Although depicted as contiguous channels in the channel mapping shown, in some implementations, the combined channel group may contain channels that are non-contiguous.

The 320 MHz wide bandwidth channel 200 may be segmented in a number of ways to define at least one primary channel and at least one secondary channel. For example, the first channel 215 may be a primary 20 MHz bandwidth channel and the second channel 225 may be a secondary 20 MHz bandwidth channel. Together, the first channel 215 and the second channel 225 may form a primary 40 MHz bandwidth channel. The third channel 235 and the fourth channel 245 may be 20 MHz bandwidth channels. Together, the third channel 235 and the fourth channel 245 may form a secondary 40 MHz bandwidth channel. The secondary 40 MHz bandwidth channel is "secondary" in relation to the primary 40 MHz bandwidth channel formed by the first channel 215 and the second channel 225. In a similar way, a first set of four channels, consisting of all four of the first channel 215, the second channel 225, the third channel 235 and the fourth channel 245, may form a primary 80 MHz bandwidth channel and a second set of four different channels may form a secondary 80 MHz bandwidth channel. In some implementations, a tertiary 80 MHz bandwidth channel may be defined from a third set of four different channels and a quaternary 80 MHz bandwidth channel may be defined from a fourth set of four different channels. Continuing the pattern, the first set of eight channels may form a primary 160 MHz bandwidth channel and the second set of eight channels may form a secondary 160 MHz bandwidth channel.

The CCA techniques in this disclosure may be performed by any type of WLAN apparatus, including an AP or a STA. Typically, when performing a CCA process, the PHY layer begins with the smallest primary channel defined in a channel list for the wide bandwidth channel, for example, the primary 20 MHz bandwidth channel. The CCA process may indicate that the primary channel is idle (also referred to as "clear") if the detection metric (such as energy) on the primary channel is below a signal detection threshold. The PHY layer also may check for the start of a WLAN signal (or packet) using a comparison of a detection metric (such as energy) with a signal detection threshold. Examples of various signal and signal detection thresholds are shown in FIGS. 12A and 12B. If the PHY layer detects a signal or a packet on the primary channel, the PHY layer may send an indication to the MAC layer. Otherwise, if the smallest primary channel is clear, the PHY layer may perform a CCA check on the smallest secondary channel, for example, the secondary 20 MHz bandwidth channel. If the smallest secondary channel is clear, the PHY layer may proceed with checking the next largest secondary channel, for example, the secondary 40 MHz bandwidth channel. Continuing the example, if the secondary 40 MHz bandwidth channel is clear, the PHY layer may then check the secondary 80 MHz bandwidth channel. At this point, the CCA check has been performed on a 160 MHz bandwidth channel. If a signal or packet is detected in any of the secondary channels, then the PHY layer may send a busy indication to the MAC layer.

In some implementations supporting a 320 MHz bandwidth channel, the CCA process is extended from the first 160 MHz bandwidth channel ("the primary 160 MHz bandwidth channel) to a secondary 160 MHz bandwidth channel using only a single additional CCA operation. In some other implementations supporting a 320 MHz bandwidth channel, if the secondary 80 MHz bandwidth channel is clear, the PHY layer may then extend the CCA to include an additional check of a tertiary 80 MHz bandwidth channel, and if clear, an additional CCA check of a quaternary 80 MHz bandwidth channel. The use of a tertiary 80 MHz bandwidth channel and a quaternary 80 MHz bandwidth channel can support a 320 MHz wide bandwidth channel by adding additional CCA checks to expand the CCA process that is used on a primary 160 MHz bandwidth channel.

Figure 3:
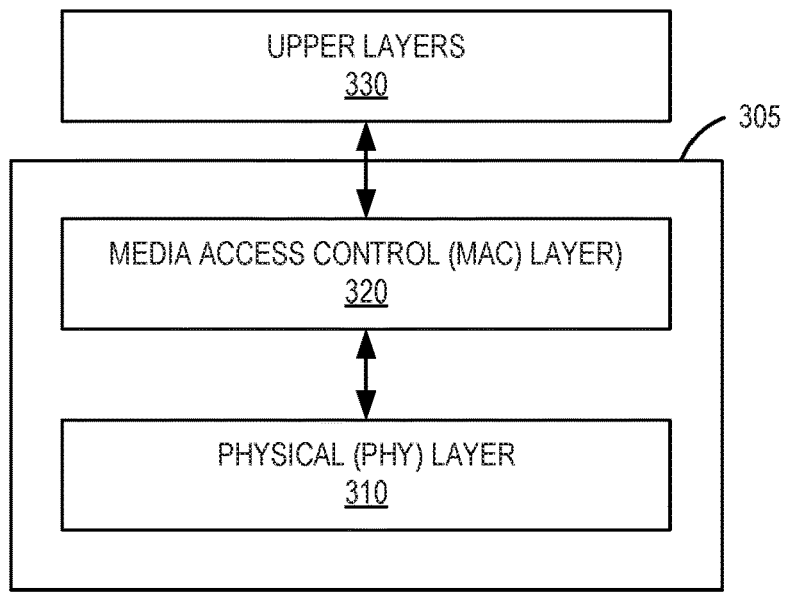
FIG. 3 shows example layers of a network interface including a physical (PHY) layer and a media access control (MAC) layer.

FIG. 3 shows example layers of a network interface 305 including a PHY layer 310 and a MAC layer 320. The PHY layer 310 may communicate one or more CCA indicators to the MAC layer 320 to indicate whether a wide bandwidth channel is available ("idle" or "clear") or not available ("busy"). In some implementations, the PHY layer 310 may perform CCA on the wide bandwidth channel in response to a CCA trigger indicator from the MAC layer 320 to the PHY layer 310. The MAC layer 320 may provide data from upper layers 330 to the PHY layer 310 to be transmitted, or may provide received data from the PHY layer 310 to the upper layers 330. The upper layers 330 may be part of the network interface 305 or may be part of a host device in which the network interface 305 is installed.

Figure 4:
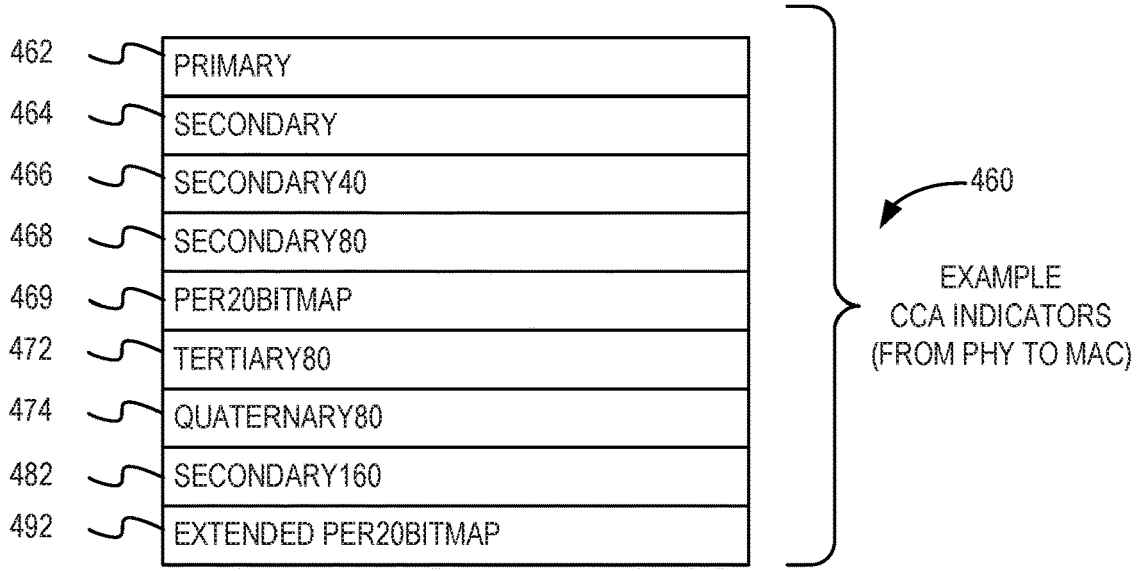
FIG. 4 shows example clear channel assessment (CCA) indicators that may be communicated from a PHY layer to a MAC layer.

FIG. 4 shows example CCA indicators 460 that may be communicated from a PHY layer to a MAC layer. A primary indicator 462 (which may be referred to as a primary20 indicator) may indicate whether the primary 20 MHz bandwidth channel is busy. A secondary indicator 464 (which may be referred to as a secondary20 indicator) may indicate whether the secondary channel (such as a secondary 20 MHz bandwidth channel) is busy. A secondary40 indicator 466 may indicate whether a secondary 40 MHz bandwidth channel is busy. A secondary80 indicator 468 may indicate whether a secondary 80 MHz bandwidth channel is busy. A per20bitmap indicator 469 may include bits to indicate the busy/idle status of each 20 MHz subchannel.

In some implementations, the example CCA indicators 460 may be expanded to include additional types of indicators. For example, a tertiary80 indicator 472 may indicate that a tertiary 80 MHz bandwidth channel is busy. A quaternary80 indicator 474 may indicate that a quaternary 80 MHz bandwidth channel is busy. A secondary160 indicator 482 may indicate that a secondary 160 MHz bandwidth channel is busy. An extended per20bitmap indicator 492 may include additional bits to indicate the busy/idle status of each 20 MHz subchannel, including those beyond the first 160 MHz portion of a wide bandwidth channel.

Figure 5:
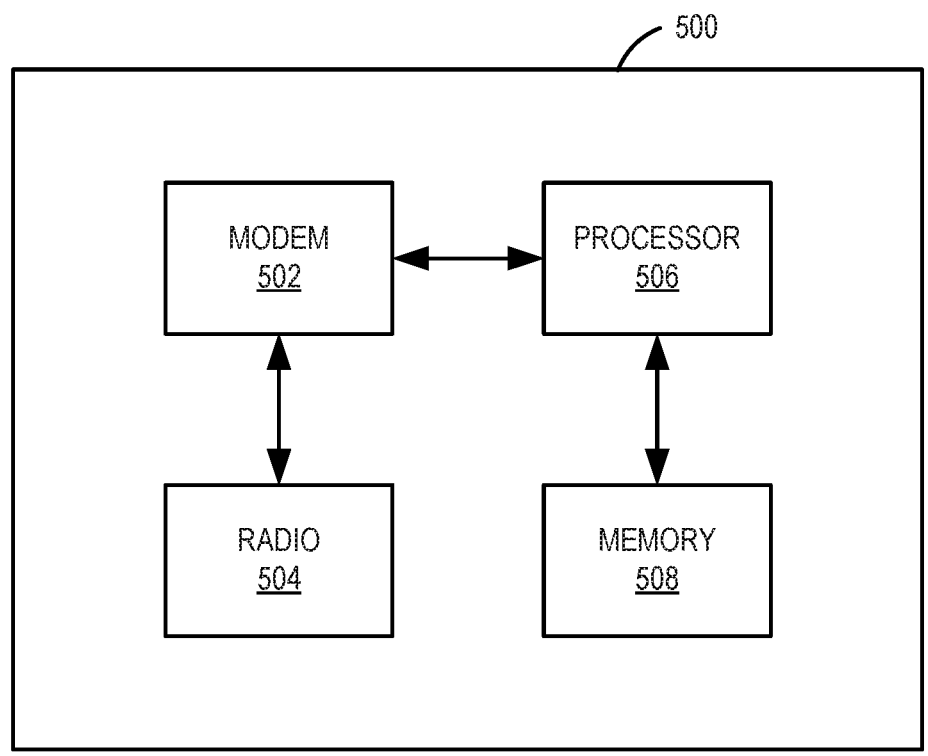
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
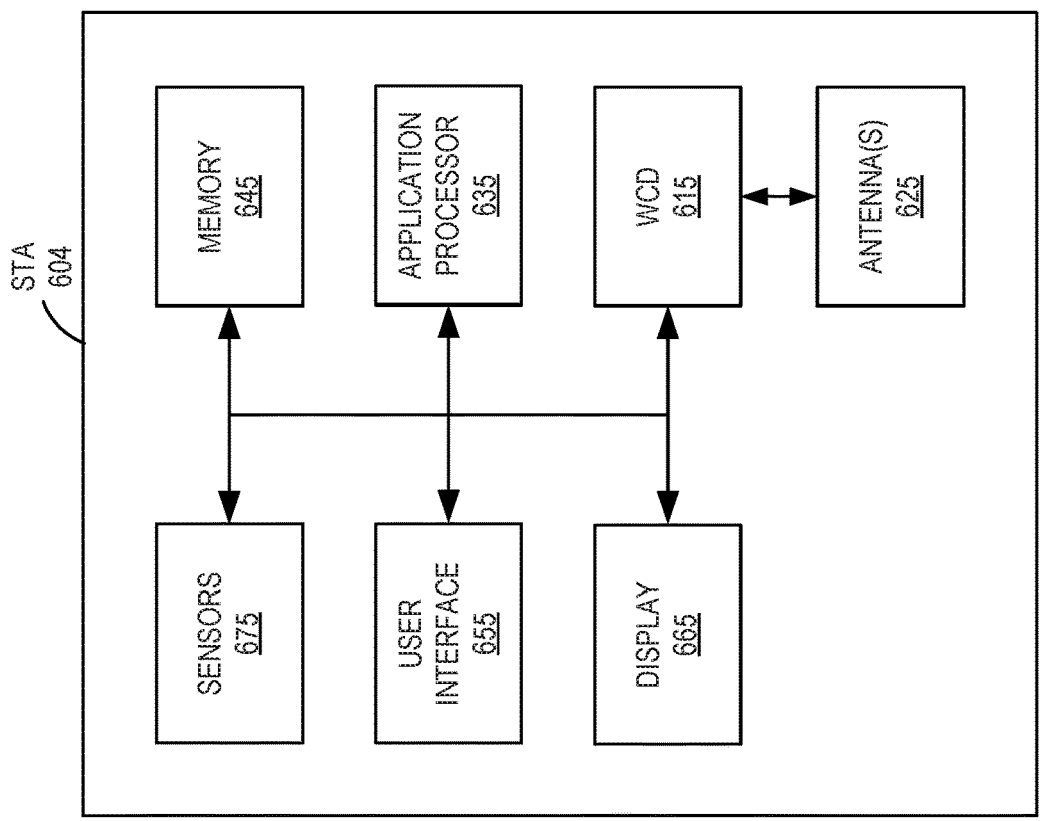
FIG. 6B shows a block diagram of an example station (STA).
Figure 6A:
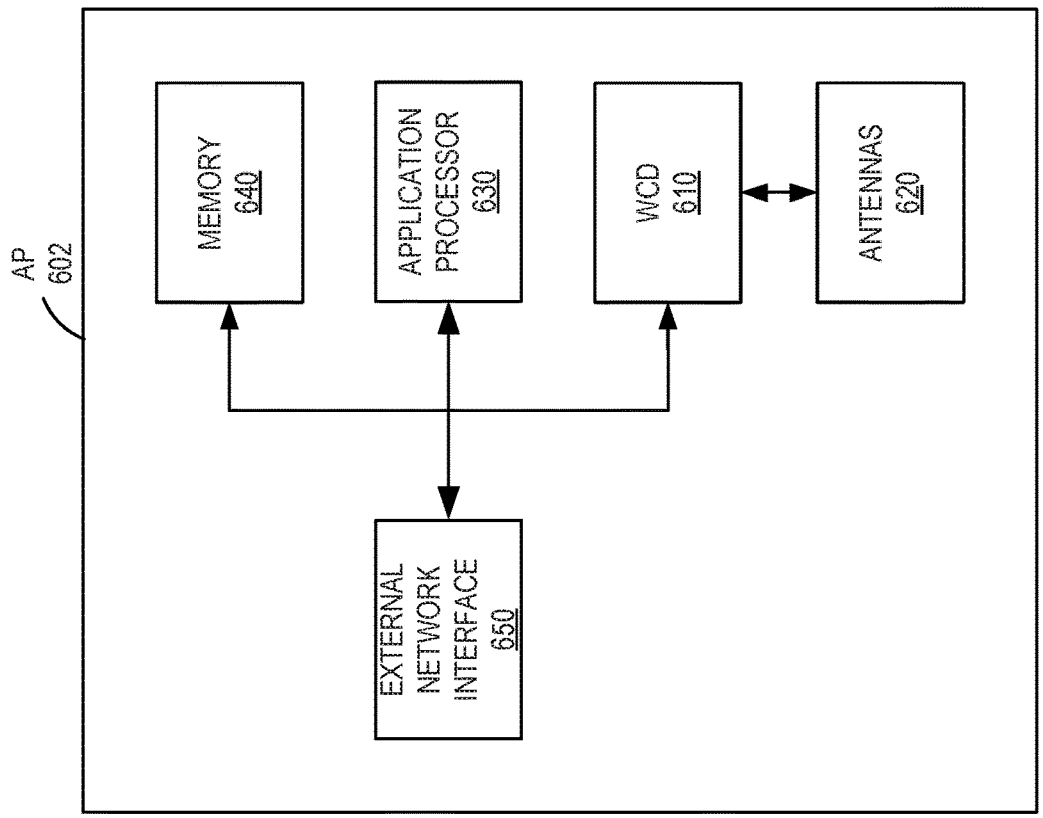
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 5000 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, current clear channel assessment (CCA) techniques may be limited to lower bandwidth channels, for example, 160 MHz bandwidth channels or smaller. As wireless communication devices evolve to use wide bandwidth channels, efficient CCA techniques are needed. Various implementations relate generally to CCA operations for a wide bandwidth channel. For example, a wide bandwidth channel may have a bandwidth that is greater than 160 MHz bandwidth, such as a bandwidth of 240 MHz or 320 MHz. The illustrative examples that follow involve the use of a 320 MHz wide bandwidth channel in particular, but the techniques may be extended to even wider bandwidth channels. Some implementations further relate to signal detection thresholds that may be used for wide bandwidth channels when performing a CCA process. In some implementations, a CCA process may be extended to include assessments of extended portions of a wide bandwidth channel such as a tertiary 80 MHz bandwidth channel and a quaternary 80 MHz bandwidth channel. In some other implementations, the CCA process may be extended to use an assessment of a secondary 160 MHz bandwidth channel.

Particular implementations of the subject matter described in this disclosure can be implemented to realize one or more of the following potential advantages. The described techniques may be used to efficiently detect a busy or idle status of a wide bandwidth channel based on segmenting the wide bandwidth channel into various portions. Additional indicator definitions permit a PHY layer to accurately and precisely indicate the CCA results for the various portions of the wide bandwidth channel.

Figure 7:
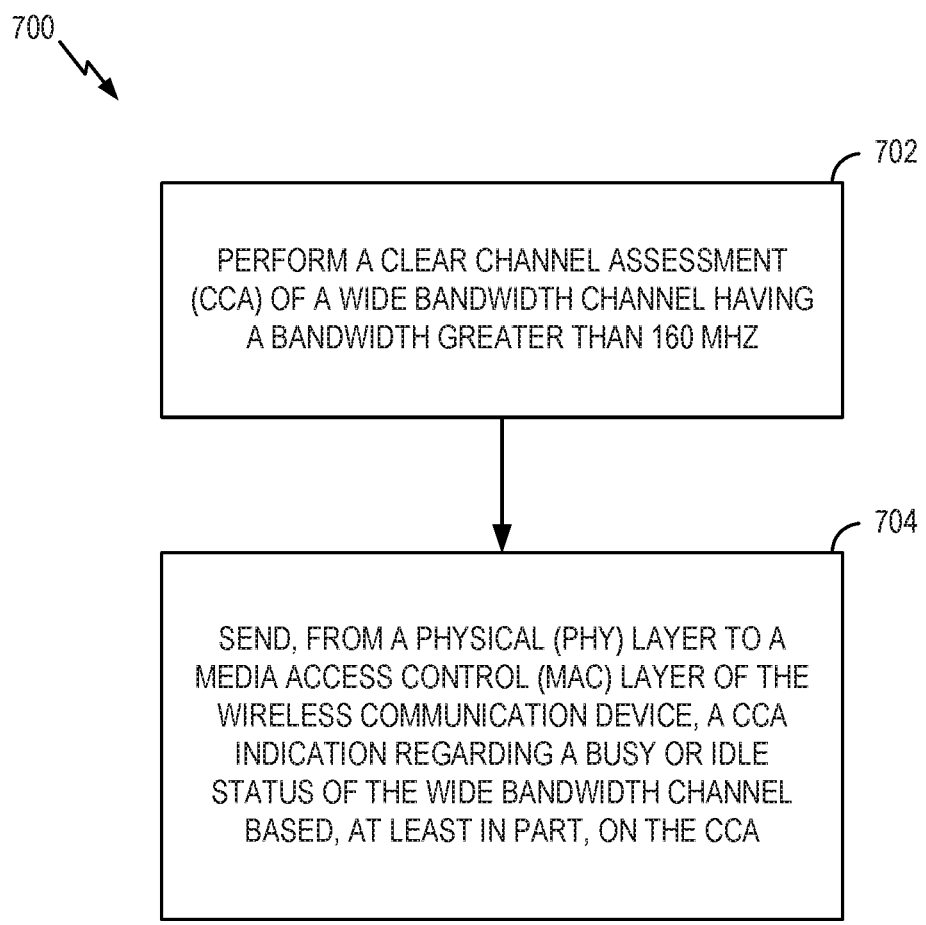
FIG. 7 shows a flowchart illustrating an example process for performing a CCA according to some implementations.

FIG. 7 shows a flowchart illustrating an example process 700 for performing a CCA according to some implementations. The process 700 may be performed by a wireless communication device such as the wireless communication device 500 described above with reference to FIG. 5. In some implementations, the process 700 may be performed by a wireless communication device operating as or within an AP or STA, such a STA 104, AP 102, AP 602, STA 604, or network interface 305 described above with reference to FIGS. 1, 3, 6A and 6B, respectively. In some implementations, the process 700 begins in block 702 with the PHY layer performing a clear channel assessment (CCA) of a wide bandwidth channel having a bandwidth greater than 160 MHz bandwidth. For example, the wide bandwidth channel may have a bandwidth of 240 MHz, 320 MHz, or greater. In block 704, the process 700 proceeds with the PHY layer sending, to a MAC layer of the wireless communication device, a CCA indication regarding a busy or idle status of the wide bandwidth channel based, at least in part, on the CCA. For example, the CCA indication may be similar to one of those described with reference to FIG. 4.

In some implementations, the CCA indication indicates the wide bandwidth channel is busy if, during the CCA process, the PHY layer detects a packet having a detection metric (such as energy) greater than a packet detection threshold. The packet detection threshold may be different depending on the size of the primary channel or secondary channel on which the measurements and assessment are being performed for the CCA process.

Figure 8:
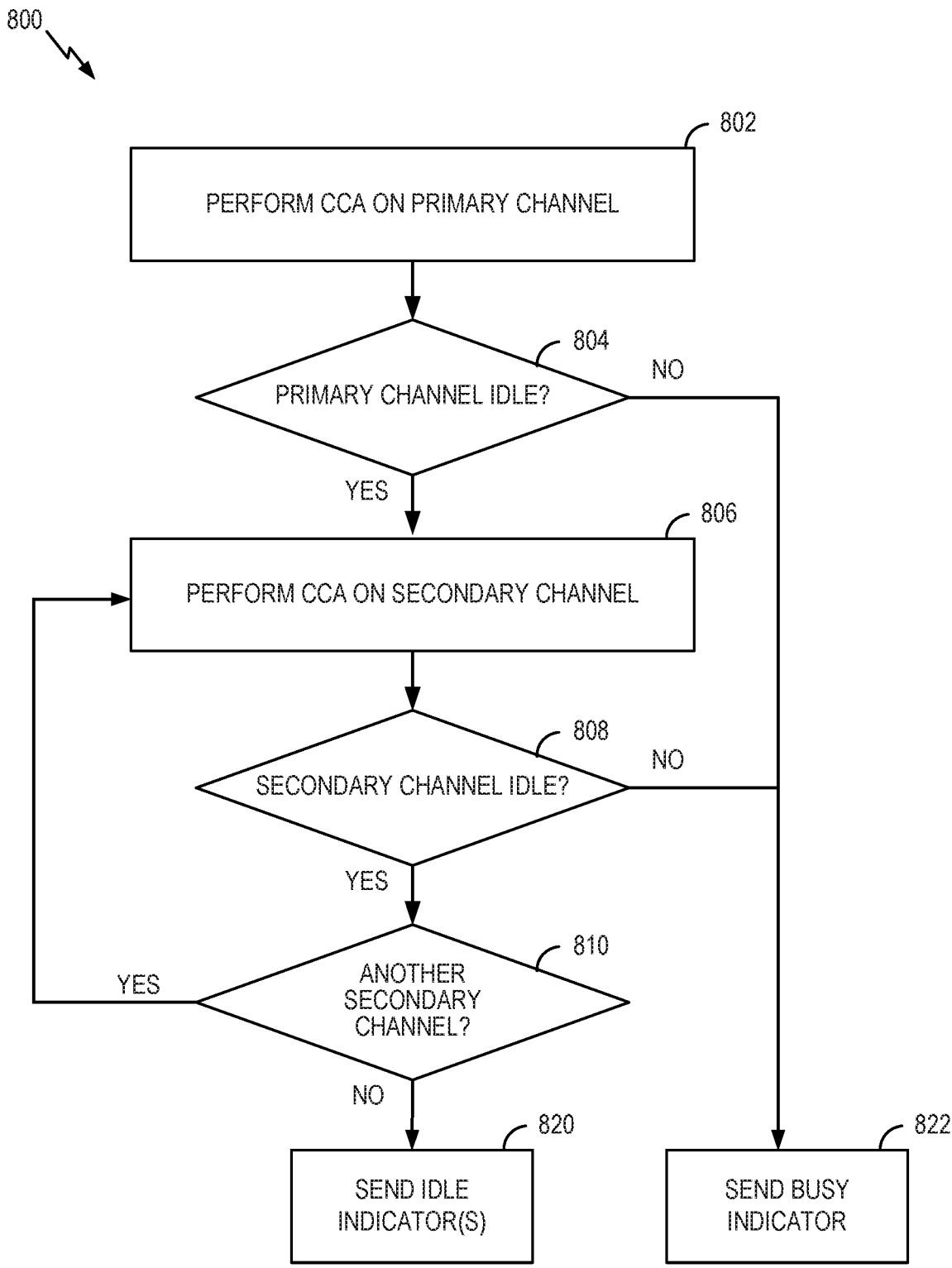
FIG. 8 shows a flowchart illustrating an example process for performing a CCA for a wide bandwidth channel according to some implementations.

FIG. 8 shows a flowchart illustrating an example process 800 for performing a CCA for a wide bandwidth channel according to some implementations. The process 800 may be performed by a wireless communication device such as the wireless communication device 500 described above with reference to FIG. 5. A conceptual depiction of the CCA checks in process 800 may be found with reference to FIG. 13A. In some implementations, the process 800 may be performed by a wireless communication device operating as or within an AP or STA, such a STA 104, AP 102, AP 602, STA 604, or network interface 305 described above with reference to FIGS. 1, 3, 6A and 6B, respectively. For example, the process 800 may be an example implementation of the process 700 described with reference to FIG. 7.

In some implementations, the process 800 begins in block 802 with a PHY layer performing a CCA check of a primary channel of the wide bandwidth channel. For example, the primary channel may be a first 20 MHz primary channel. During the CCA check of the primary 20 MHz bandwidth channel, the PHY layer may compare a detection metric (such as energy) with a detection threshold (such as a signal detection threshold or a packet detection threshold) to determine if the channel is idle or is busy. Examples of the thresholds used for different primary channel bandwidths are provided in FIG. 12A.

In block 804, the process 800 proceeds with the PHY layer determining whether the primary channel is idle. If the primary channel is not idle (meaning a signal or a packet has been detected during the CCA check in block 802), then the process 800 proceeds to block 822, in which the PHY layer sends a CCA indication (with a busy indicator for the primary channel) to the MAC layer. Otherwise, if the primary channel is idle (meaning no signal or packet has been detected during the CCA check in block 802), then the process 800 proceeds to block 806.

In block 806, the process 800 proceeds with the PHY layer performing a CCA check on a secondary channel (beginning with the smallest secondary channel, for example, a secondary 20 MHz bandwidth channel, in a channel breakdown for the wide bandwidth channel). During the CCA check of the secondary 20 MHz bandwidth channel, the PHY layer may compare a detection metric (such as energy) for the secondary channel with a detection threshold (such as a signal detection threshold or a packet detection threshold) to determine if the channel is idle or is busy. Examples of the thresholds used for different secondary channel bandwidths are provided in FIG. 12B.

In block 808, the process 800 proceeds with the PHY layer determining whether the secondary channel is idle. If the secondary channel is not idle (meaning a signal or a packet has been detected during the CCA check in block 806), then the process 800 proceeds to block 822. In block 822, the PHY layer may send a CCA indication (with a busy indicator for the secondary channel) to the MAC layer. Otherwise, if the secondary channel is idle (meaning no signal or packet has been detected during the CCA check in block 806), then the process 800 proceeds to block 810.

In block 810, the process 800 proceeds with the PHY layer determining whether there is another secondary channel defined for the wide bandwidth channel. If so, the process 800 proceeds back to block 806 to perform one or more additional CCA checks on larger secondary channels defined for the wide bandwidth channel. For example, a next largest secondary channel may be a secondary 40 MHz bandwidth channel—twice the size of the smallest secondary channel. Continuing the pattern, the next largest secondary channel (after the 40 MHz bandwidth channel) may be a secondary 80 MHz bandwidth channel, and so on. In some implementations, the largest secondary channel may be a secondary 160 MHz bandwidth channel. If no other secondary channels are defined, the process 800 proceeds to block 820. In block 820, the PHY layer may send an idle indicator to the MAC layer to indicate that the wide bandwidth channel is clear for use by the transmitter.

Figure 9:
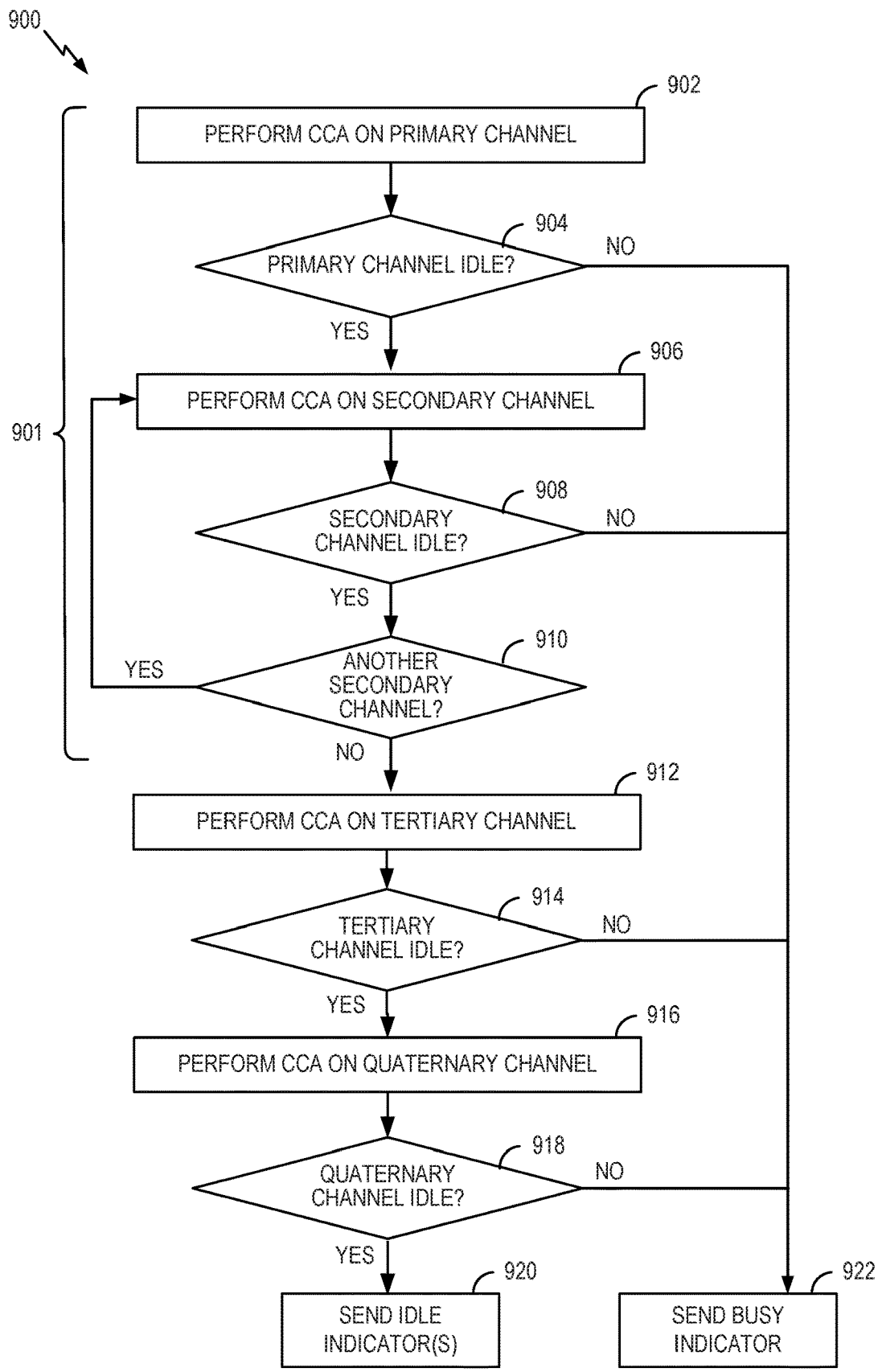
FIG. 9 shows a flowchart illustrating another example process for performing a CCA for a wide bandwidth channel according to some implementations.

FIG. 9 shows a flowchart illustrating another example process 900 for performing a CCA for a wide bandwidth channel according to some implementations. The process 900 may be performed by a wireless communication device such as the wireless communication device 500 described above with reference to FIG. 5. A conceptual depiction of the CCA checks in process 900 may be found with reference to FIG. 13B. In some implementations, the process 900 may be performed by a wireless communication device operating as or within an AP or STA, such a STA 104, AP 102, AP 602, STA 604, or network interface 305 described above with reference to FIGS. 1, 3, 6A, and 6B, respectively. For example, the process 900 may be an example implementation of the process 700 described with reference to FIG. 7. In FIG. 9, the PHY layer may perform a traditional CCA procedure 901 for the first portion (such as a first 160 MHZ portion) of the wide bandwidth channel. Following the traditional CCA procedure 901, the PHY layer may perform additional CCA checks for remaining 80 MHz portions of the wide bandwidth channel.

In some implementations, the process 900 begins in block 902 with the PHY layer performing a CCA check of a primary channel of the wide bandwidth channel. For example, the primary channel may be a first 20 MHz primary channel. During the CCA check of the primary channel, the PHY layer may compare a detection metric with a detection threshold (such as a signal detection threshold or a packet detection threshold) to determine if the channel is idle or busy. Examples of the thresholds used for different primary channel bandwidths are provided in FIG. 12A.

In block 904, the process 900 proceeds with the PHY layer determining whether the primary channel is idle. If the primary channel is not idle (meaning a signal or a packet has been detected during the CCA in block 902), then the process 900 proceeds to block 922, in which the PHY layer sends a CCA indication (with a busy indicator for the primary channel) to the MAC layer. Otherwise, if the primary channel is idle (meaning no signal or packet has been detected during the CCA in block 902), then the process 900 proceeds to block 906.

In block 906, the process 900 proceeds with the PHY layer performing a CCA check on a secondary channel (beginning with the smallest secondary channel in a channel breakdown for the wide bandwidth channel). During the CCA check on the secondary channel, the PHY layer may compare a detection metric for the secondary channel with a detection threshold (such as a signal detection threshold or a packet detection threshold) to determine if the channel is idle or busy. Examples of the thresholds used for different secondary channel bandwidths are provided in FIG. 12B.

In block 908, the process 900 proceeds with the PHY layer determining whether the secondary channel is idle. If the secondary channel is not idle (meaning a signal or a packet has been detected during the CCA check in block 906), then the process 900 proceeds to block 922, in which the PHY layer sends a CCA indication (with a busy indicator for the secondary channel) to the MAC layer. Otherwise, if the secondary channel is idle (meaning no signal or packet has been detected during the CCA check in block 906), then the process 900 proceeds to block 910.

In block 910, the process 900 proceeds with the PHY layer determining whether there is another secondary channel defined for the wide bandwidth channel. If so, the process 900 proceeds back to block 906 to perform CCA checks on the additional secondary channels defined for a first portion of the wide bandwidth channel. For example, in some implementations, the largest secondary channel may be a secondary 80 MHz bandwidth channel. After CCA has been performed on all of the secondary channels, the process 900 may then proceed to block 912, in which a CCA is performed on a tertiary channel (such as a tertiary 80 MHz bandwidth channel). In block 914, the process 900 proceeds with the PHY layer determining whether the tertiary channel is idle. If the tertiary channel is not idle (meaning a signal or a packet has been detected during the CCA in block 912), then the process 900 proceeds to block 922. In block 922, the PHY layer may send a CCA indication (with a busy indicator for the tertiary channel) to the MAC layer. Otherwise, if the tertiary channel is idle (meaning no signal or packet has been detected by the CCA in block 912), then the process 900 proceeds to block 916.

In block 916, the process 900 proceeds with the PHY layer performing a CCA on a quaternary channel (such as a quaternary 80 MHz bandwidth channel). In block 918, the process 900 proceeds with determining whether the quaternary channel is idle. If the quaternary channel is not idle (meaning a signal or a packet has been detected during the CCA in block 916), then the process 900 proceeds to block 922, in which the PHY layer may send a CCA indication (with a busy indicator for the quaternary channel) to the MAC layer. Otherwise, if the quaternary channel is idle (meaning no signal or packet has been detected by the CCA in block 916), then the process 900 proceeds to block 920.

The process 900 may be adjusted in several ways. For example, the busy indicator in block 922 may be reported on the first busy instance of any of the primary or secondary channels. Using the notation from FIG. 4 as an example, the CCA indication may be the first busy indication for any of the primary (primary20), secondary (secondary20), secondary40, secondary80, tertiary80, or quaternary80 indicators. Other combinations or parallel processes may be performed, such as those described in FIG. 10.

Figure 10:
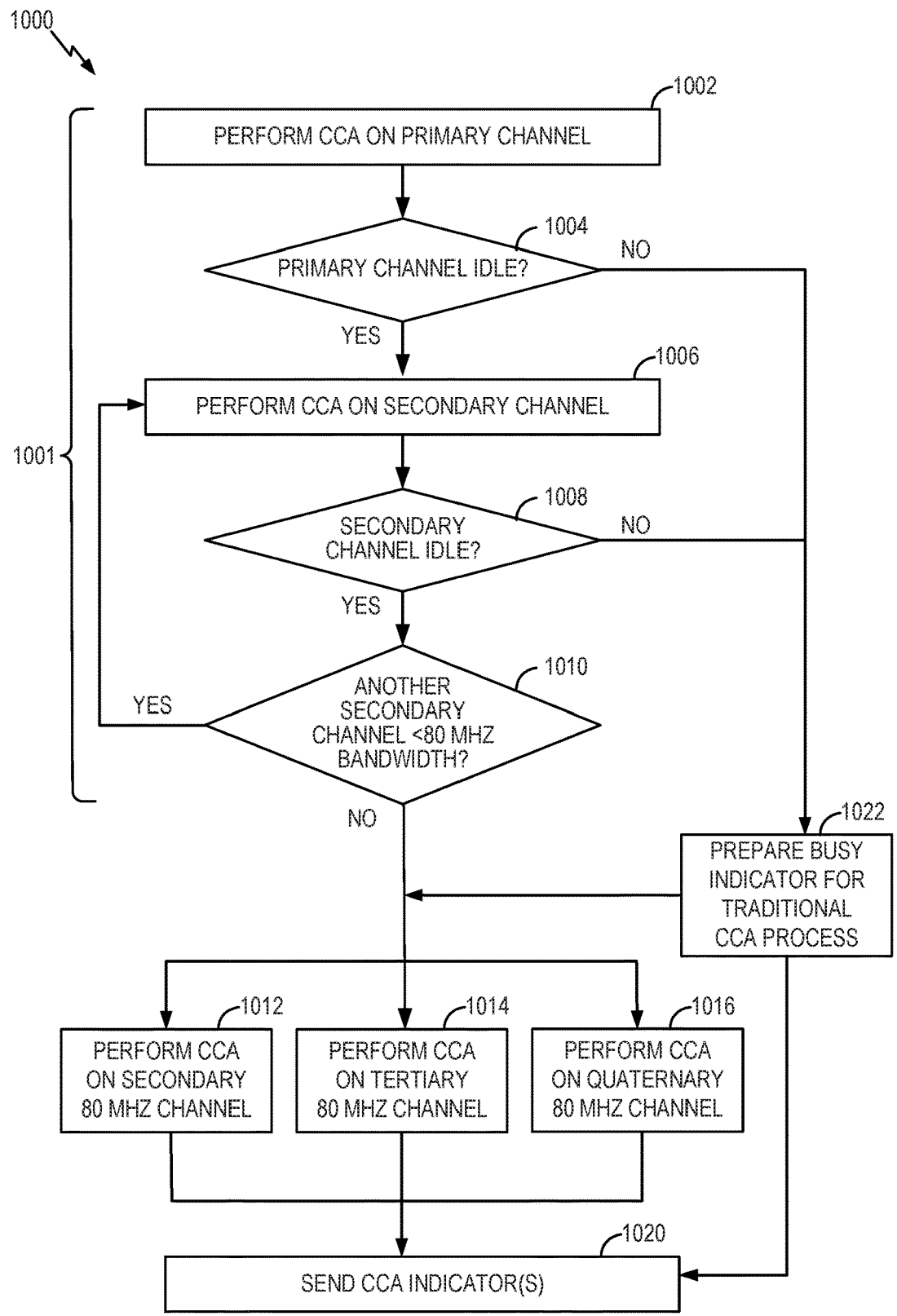
FIG. 10 shows a flowchart illustrating another example process for performing a CCA for a wide bandwidth channel using parallel CCA according to some implementations.

FIG. 10 shows a flowchart illustrating another example process 1000 for performing a CCA for a wide bandwidth channel using parallel CCA according to some implementations. The process 1000 may be performed by a wireless communication device such as the wireless communication device 500 described above with reference to FIG. 5. A conceptual depiction of the CCA checks in process 1000 may be found with reference to FIG. 13B. In some implementations, the process 1000 may be performed by a wireless communication device operating as or within an AP or STA, such a STA 104, AP 102, AP 602, STA 605, or network interface 305 described above with reference to FIGS. 1, 3, 6A, and 6B, respectively. For example, the process 1000 may be an example implementation of the process 700 described with reference to FIG. 7. In FIG. 10, the PHY layer may perform a traditional CCA procedure 1001 for a first portion (such as a first 80 MHZ portion) of the wide bandwidth channel. Following the traditional CCA procedure 1001, the PHY layer may perform additional CCA checks for remaining 80 MHz portions of the wide bandwidth channel. The additional CCA checks for the remaining 80 MHz portions may be done in parallel and may result in different CCA indicators being sent to the MAC layer.

In some implementations, the process 1000 begins in block 1002 with the PHY layer performing a CCA check of a primary channel of the wide bandwidth channel. For example, the primary channel may be a first 20 MHz primary channel. During the CCA check of primary channel, the PHY layer may compare a detection metric with a detection threshold (such as a signal detection threshold or a packet detection threshold) to determine if the channel is busy or idle. Examples of the thresholds used for different primary channel bandwidths are provided in FIG. 12A.

In block 1004, the process 1000 proceeds with the PHY layer determining whether the primary channel is idle. If the primary channel is not idle (meaning a signal or a packet has been detected during the CCA check in block 1002), then the process 1000 proceeds to block 1022, in which the PHY layer may prepare a CCA indication (with a busy indicator for the primary channel) to send to the MAC layer. Otherwise, if the primary channel is idle (meaning no signal or packet has been detected during the CCA check in block 1002), then the process 1000 proceeds to block 1006.

In block 1006, the process 1000 proceeds with the PHY layer performing a CCA check on a secondary channel (beginning with the smallest secondary channel in a channel breakdown for the wide bandwidth channel). During the CCA check of the secondary channel, the PHY layer may compare a detection metric for the secondary channel with a detection threshold (such as a signal detection threshold or a packet detection threshold) to determine if the channel is idle or busy. Examples of the thresholds for different sizes of secondary channel are provided in FIG. 12B.

In block 1008, the process 1000 proceeds with the PHY layer determining whether the secondary channel is idle. If the secondary channel is not idle (meaning a signal or a packet has been detected during the CCA check in block 1006), then the process 1000 proceeds to block 1022. In block 1022, the PHY layer may prepare a CCA indication (with a busy indicator for the secondary channel) to send to the MAC layer. Otherwise, if the secondary channel is idle (meaning no signal or packet has been detected during the CCA check in block 1006), then the process 1000 proceeds to block 1010.

The steps in block 1006 and block 1008 may be performed for each secondary channel that has less than 80 MHz bandwidth. In block 1010, the process 1000 proceeds with determining whether there is another secondary channel less than 80 MHz bandwidth defined for the wide bandwidth channel. If so, the process 1000 proceeds back to block 1006 to perform CCA checks on further secondary channels defined for a first portion of the wide bandwidth channel. For example, in some implementations, the largest secondary channel may be a 40 MHz secondary channel. After CCA has been performed on all of the secondary channels in the first portion of the wide bandwidth channel, the process 1000 proceeds to block 1012, in which the process 1000 proceeds with performing further CCAs for remaining 80 MHz portions of the wide channel bandwidth. The further CCAs may be performed in parallel, which can reduce the time for the overall process 1000. For example, the process 1000 may proceed to blocks 1012, 1014, and 1016, concurrently. For a 240 MHz wide bandwidth channel, block 1016 may be omitted. In block 1012, the process 1000 includes performing a CCA check of a secondary 80 MHz bandwidth channel. In block 1014, the process 1000 includes performing a CCA check of a tertiary 80 MHz bandwidth channel. In block 1016, the process 1000 includes performing CCA for a quaternary 80 MHz bandwidth channel.

Following the parallel CCA checks in blocks 1012, 1014, and 1016, the process 1000 may proceed to block 1020. In block 1020, the PHY layer may send CCA indication(s) to the MAC layer. In some implementations, the CCA indications may include an indicator for the traditional CCA procedure 1001 (the indicator prepared in 1022). The indicator for the traditional CCA procedure 1011 may indicate the first busy instance of any of the primary or secondary channels (that are less than 80 MHz bandwidth). Additionally, the CCA indicators sent to the MAC layer in block 1020 may include indicators for each of the remaining 80 MHz portions of the wide bandwidth channel. Using the notation from FIG. 4 as an example, the CCA indication may be the first busy indication for any of the primary (primary20), secondary (secondary20), or secondary40, as well as CCA indications for each of the secondary80, tertiary80, and quaternary80.

The examples of the CCA indications in FIGS. 9 and 10 are provided for illustrative purposes. Other combinations of indicators (including those referred to in FIG. 4) may be used for a PHY layer to report CCA status to the MAC layer. For example, a traditional CCA report may be augmented with a secondary160 indicator. In another example, the traditional CCA report may be augmented with tertiary80 to support up to a 240 MHz wide bandwidth channel. The CCA report may include the tertiary80 and quaternary80 indicators to support up to a 320 MHz wide bandwidth channel. For wide bandwidth channels greater than 320 MHz bandwidth, further indicators may be included and would be apparent to those of skill in the art.

In some implementations, the traditional CCA procedure 1001 may be performed in parallel (concurrently) with the CCA checks for the secondary 80 MHz bandwidth channel, the tertiary 80 MHz bandwidth channel, and the quaternary 80 MHz bandwidth channel.

Figure 11:
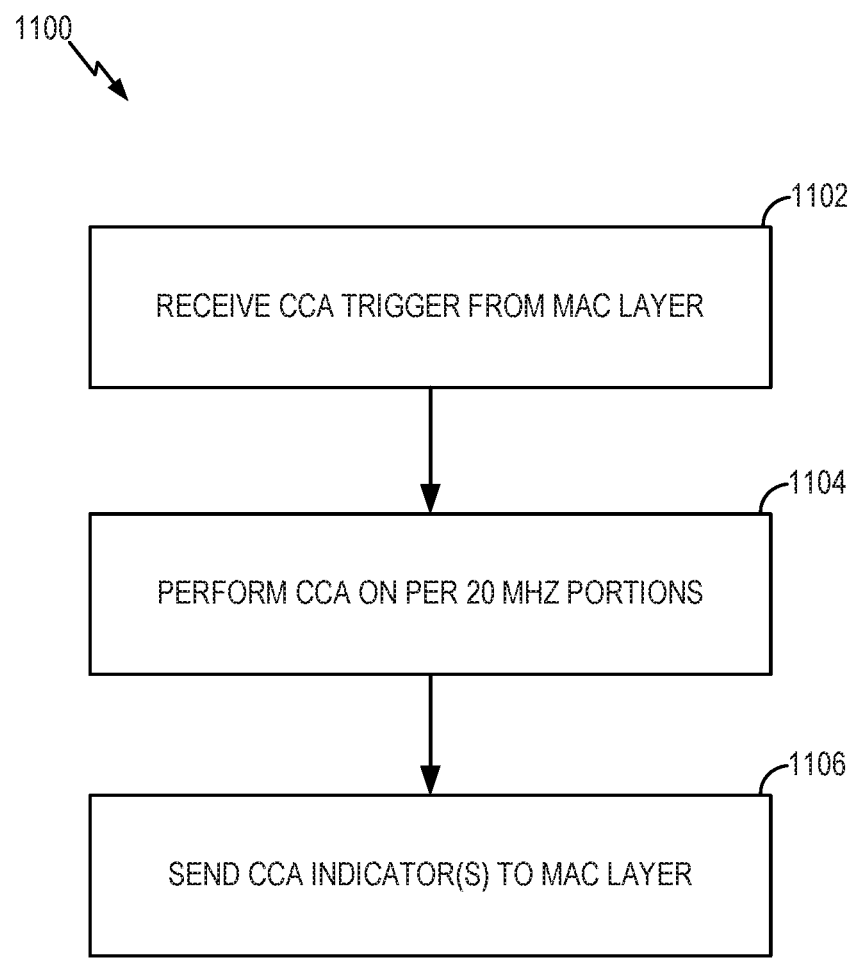
FIG. 11 shows a flowchart illustrating another example process for performing a CCA for a wide bandwidth channel using per 20 MHz CCA according to some implementations.

FIG. 11 shows a flowchart illustrating another example process 1100 for performing a CCA for a wide bandwidth channel using per 20 MHz CCA according to some implementations. The process 1100 may be performed by a wireless communication device such as the wireless communication device 500 described above with reference to FIG. 5. A conceptual depiction of the CCA checks in process 1100 may be found with reference to FIG. 13C. In some implementations, the process 1100 may be performed by a wireless communication device operating as or within an AP or STA, such a STA 104, AP 102, AP 602, STA 604, or network interface 305 described above with reference to FIGS. 1, 3, 6A, and 6B, respectively. For example, the process 1100 may be an example implementation of the process 700 described with reference to FIG. 7. In FIG. 11, the PHY layer may perform a per 20 MHz CCA check for at least a portion of the wide bandwidth channel.

In some implementations, the process 1100 begins in block 1102 with the PHY layer receiving a CCA trigger from a MAC layer. In some implementations, the CCA trigger may indicate a CCA indication mode that the MAC layer is requesting the PHY layer to perform. CCA indication mode 0 may be used for processes 900 and 1000. CCA indication mode 1 or greater may be used with process 1100.

In block 1104, the process 1100 proceeds with the PHY layer performing CCA checks on per-20 MHz portions of the wide bandwidth channel. The CCA indication mode may determine how much of the wide bandwidth channel is used with per 20 MHz CCA checks. A remaining portion may use larger bandwidth CCA checks. Examples of the CCA indication mode and resulting CCA checks are describe below. There may be several variations of the per 20-MHz CCA checks. For example, the primary channel check may include a primary 160 MHz portion of the wide bandwidth channel. If the CCA indication mode is a first value (such as "1"), the PHY layer may perform CCA checks on 20 MHz portions in the secondary 20/40/80/160 MHz bandwidth channels, as well as 40 MHz portions in secondary 40/80/160 MHz bandwidth channels, 80 MHz portions in secondary 80/160 MHz bandwidth channels, and 160 MHz portions in secondary 160 MHz bandwidth channel.

If the CCA indication mode is second value (such as "2"), the PHY layer may perform CCA checks for all 20 Mhz portions in the primary 20 MHz bandwidth channel and secondary 20/40/80/160 MHz bandwidth channels of the wide bandwidth channel. The per20bitmap indicator (referring to FIG. 4) may be extended to 16 bits to provide additional bits for reporting the results of the CCA checks in process 1100.

In some implementations, if the CCA indication mode is a first value (such as "1"), the PHY layer may perform CCA checks on any 20 MHz portion in secondary 20/40/80 MHz bandwidth channels, 40 MHz portion in secondary 40/80 MHz bandwidth channels, 80 MHz portion in secondary 80 MHz bandwidth channels, and 20, 40, and 80 MHz portions of tertiary 80 MHz bandwidth channel and quaternary 80 MHz bandwidth channel.

In some implementations, if the CCA indication mode is a second value (such as "2"), the PHY layer may perform CCA checks any 20 Mhz portion in primary 20 MHz, secondary 20/40/80 MHz bandwidth channels, tertiary 80 MHz bandwidth channel, and quaternary 80 MHz bandwidth channel.

In block 1106, the process 1100 proceeds with the PHY layer sending the CCA indicators to the MAC layer.

FIG. 12A shows a chart of thresholds for use in performing physical carrier sensing on a primary channel according to some implementations. The examples in FIG. 12B are merely examples, and other thresholds may be used in other instances or applications. For example, the signal detection threshold for a wide bandwidth channel having a 240 MHz bandwidth may be −71 dBm. The signal detection threshold for a wide bandwidth channel having a 320 MHz bandwidth may be −70 dBm.

| Primary channel sizes | CCA threshold (detection threshold) |
|---|---|
| Any signal in primary 20 MHz | −62 dBm |
| Detection of the start of WLAN signal in primary 20 MHz | −82 dBm |
| Detection of the start of WLAN signal in primary 40 MHz | −79 dBm |

-continued

| Primary channel sizes | CCA threshold (detection threshold) |
|---|---|
| Detection of the start of WLAN signal in primary 80 MHz | −76 dBm |
| Detection of the start of WLAN signal in primary 160 MHz | −73 dBm |
| Detection of the start of WLAN signal in 240 MHz, or 160 + 80, 80 + 160, 3 × 80 MHz | −71 dBm |
| Detection of the start of WLAN signal in 320 MHz, or 160 + 160 MHz | −70 dBm |

FIG. 12B shows a chart of thresholds for use in performing physical carrier sensing on a secondary channel, tertiary channel, or quaternary channel according to some implementations. While FIG. 12B includes illustrative examples, other thresholds may be used in other instances or applications. For example, the signal detection threshold for a tertiary 80 MHz bandwidth channel (and a quaternary 80 MHz bandwidth channel) may be −69 dBm. The packet detection threshold for the tertiary 80 MHz bandwidth channel and the quaternary 80 MHz bandwidth channel may be −56 dBm. If a secondary 160 MHz bandwidth channel is defined, the signal detection threshold for that secondary channel may be −66 dBm (and the packet detection threshold may be −53 dBm).

| Secondary channel sizes | WLAN signal (packet detection threshold) | Non-WLAN signal (signal detection threshold) |
|---|---|---|
| Any 20 MHz subchannel(s) not containing primary20 | Max (−72 dBm, OBSS_PD) | −62 dBm |
| Any 40 MHz subchannel(s) not containing primary20 | Max (−72 dBm, OBSS_PD + 3) | −59 dBm |
| Secondary/tertiary/quaternary80 | Max (−69 dBm, OBSS_PD + 6) | −56 dBm |
| Secondary160 | Max (−66 dBm, OBSS_PD + 9) | −53 dBm |

This disclosure describes several examples of CCA checks that may be used with a wide bandwidth channel. For example, FIGS. 13A-13E show several examples of CCA checks that may be performed for a 320 MHz wide bandwidth channel. The examples are illustrative of some aspects, but not necessarily all aspects. Other examples or combinations may be contemplated within the scope of the present disclosure. The CCA checks shown in FIGS. 13A-13E may be performed by a wireless communication device such as the wireless communication device 500 described above with reference to FIG. 5. In some implementations, the CCA checks may be performed by a wireless communication device operating as or within an AP or STA, such a STA 104, AP 102, AP 602, STA 604, or network interface 305 described above with reference to FIGS. 1, 3, 6A, and 6B, respectively.

Figure 13A:
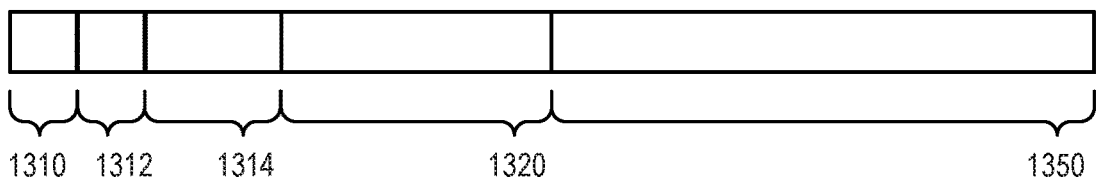
FIG. 13A shows a first example of CCA checks for an example wide bandwidth channel.

FIG. 13A shows a first example of CCA checks for an example wide bandwidth channel. The example in FIG. 13A may be a conceptual depiction of the CCA checks in process 800 described with reference to FIG. 8. A wireless communication device may perform CCA checks to detect energy on a primary 20 MHz bandwidth channel 1310, a secondary 20 MHz bandwidth channel 1312, a secondary 40 MHz bandwidth channel 1314, a secondary 80 MHz bandwidth channel 1320, and a secondary 160 MHz bandwidth channel 1350.

In some implementations, the wireless communication device may perform the CCA checks sequentially in the following order: primary 20 MHz bandwidth channel 1310, the secondary 20 MHz bandwidth channel 1312, the secondary 40 MHz bandwidth channel 1314, the secondary 80 MHz bandwidth channel 1320, and the secondary 160 MHz bandwidth channel 1350. In some implementations, the wireless communication device may concurrently perform some of the CCA checks. For example, the wireless communication device may perform sequential CCA checks for some of the channels and may perform concurrent CCA checks for other channels. In one example, the wireless communication device may sequentially perform CCA checks the primary 20 MHz bandwidth channel 1310, the secondary 20 MHz bandwidth channel 1312, and the secondary 40 MHz bandwidth channel 1314, and then concurrently perform CCA checks for the secondary 80 MHz bandwidth channel 1320, and the secondary 160 MHz bandwidth channel 1350.

Figure 13B:
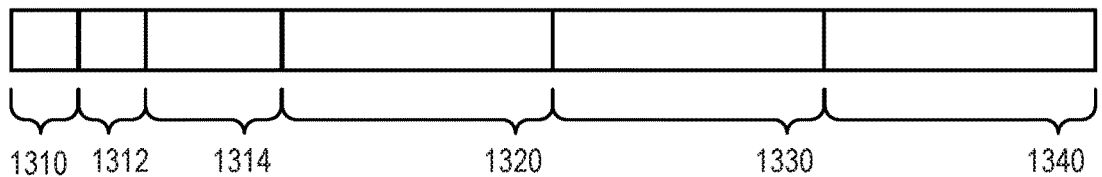
FIG. 13B shows a second example of CCA checks for the example wide bandwidth channel.

FIG. 13B shows a second example of CCA checks for the example wide bandwidth channel. The example in FIG. 13B may be a conceptual depiction of the CCA checks in processes 900 and 1000 described with reference to FIGS. 9 and 10, respectively. A wireless communication device may perform CCA checks to detect energy on a primary 20 MHz bandwidth channel 1310, a secondary 20 MHz bandwidth channel 1312, a secondary 40 MHz bandwidth channel 1314, and a secondary 80 MHz bandwidth channel 1320. Thus, the first half (160 MHz bandwidth) of the wide bandwidth channel (320 MHz bandwidth) may use a pattern of 20/40/80 MHz bandwidth secondary channels. The wireless communication device may also perform CCA checks for a tertiary 80 MHz bandwidth channel 1330 and a quaternary 80 MHz bandwidth channel 1340.

As described above, the CCA checks may be performed sequentially, concurrently, or a combination thereof. For example, the wireless communication device may sequentially perform CCA checks the primary 20 MHz bandwidth channel 1310, the secondary 20 MHz bandwidth channel 1312, and the secondary 40 MHz bandwidth channel 1314, and then concurrently perform CCA checks for the secondary 80 MHz bandwidth channel 1320, the tertiary 80 MHz bandwidth channel 1330, and the quaternary 80 MHz bandwidth channel 1340.

Figure 13C:
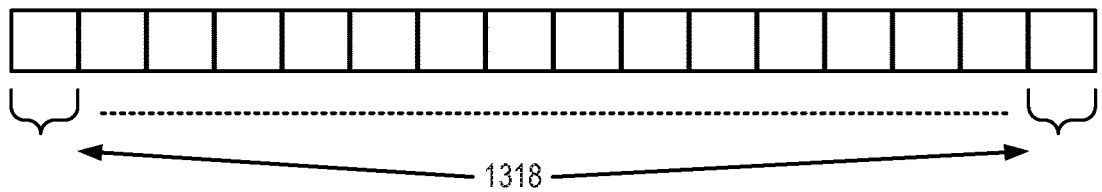
FIG. 13C shows a third example of CCA checks for the example wide bandwidth channel.

FIG. 13C shows a third example of CCA checks for the example wide bandwidth channel. The example in FIG. 13C may be a conceptual depiction of the CCA checks in process 1100 described with reference to FIG. 11. The wide bandwidth channel may be divided into 20 MHz bandwidth channels 1318. A wireless communication device may perform CCA checks for each 20 MHz bandwidth channel 1318. In some implementations, the wireless communication device may prepare a CCA indication report that includes a busy or idle status for each 20 MHz bandwidth channel 1318 that makes up the wide bandwidth channel. In some implementations, the CCA indication report may include a bitmap such that each bit in the bitmap represents a different 20 MHz bandwidth channel 1318.

Figure 13D:
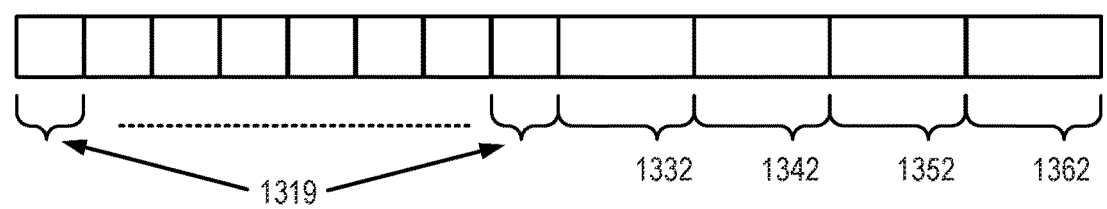
FIG. 13D shows a fourth example of CCA checks for the example wide bandwidth channel.

FIG. 13D shows a fourth example of CCA checks for the example wide bandwidth channel. In this example, a wireless communication device may perform a hybrid which includes per-20 MHz bandwidth CCA checks for a first portion of the wide bandwidth channel as well as CCA checks for larger bandwidth channels for a second portion of the wide bandwidth channel. In the example shown in FIG. 13D, a wide bandwidth channel may perform CCA checks for 20 MHz bandwidth channels for the first 160 MHz bandwidth of a 320 MHz bandwidth wide bandwidth channel. The wireless communication device may then perform CCA checks for each 80 MHz bandwidth channel of the second 160 MHz bandwidth of the 320 MHz bandwidth wide bandwidth channel. Shown in FIG. 13D, the wireless communication device may perform per-20 MHz bandwidth checks for 20 MHz bandwidth channels 1319 and per 80 MHz bandwidth checks for each of a plurality of secondary 80 MHz bandwidth channels 1332, 1342, 1352, and 1362.

Figure 13E:
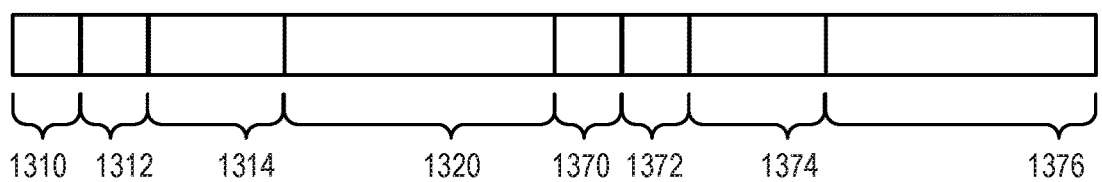
FIG. 13E shows a fifth example of CCA checks for the example wide bandwidth channel.

FIG. 13E shows a fifth example of CCA checks for the example wide bandwidth channel. A wireless communication device may perform CCA checks to detect energy on a primary 20 MHz bandwidth channel 1310, a secondary 20 MHz bandwidth channel 1312, a secondary 40 MHz bandwidth channel 1314, and a secondary 80 MHz bandwidth channel 1320. Thus, the first half (160 MHz bandwidth) of the wide bandwidth channel (320 MHz bandwidth) may use a pattern of 20/40/80 MHz bandwidth secondary channels. The same pattern may be used for the second half (160 MHz bandwidth) of the wide bandwidth channel. For example, the wireless communication device may perform CCA checks to detect energy on a primary 20 MHz bandwidth channel 1370, a secondary 20 MHz bandwidth channel 1372, a secondary 40 MHz bandwidth channel 1374, and a secondary 80 MHz bandwidth channel 1376. The wireless communication device may perform the CCA checks for the first half and the second half either in parallel or sequentially.

Figure 14:
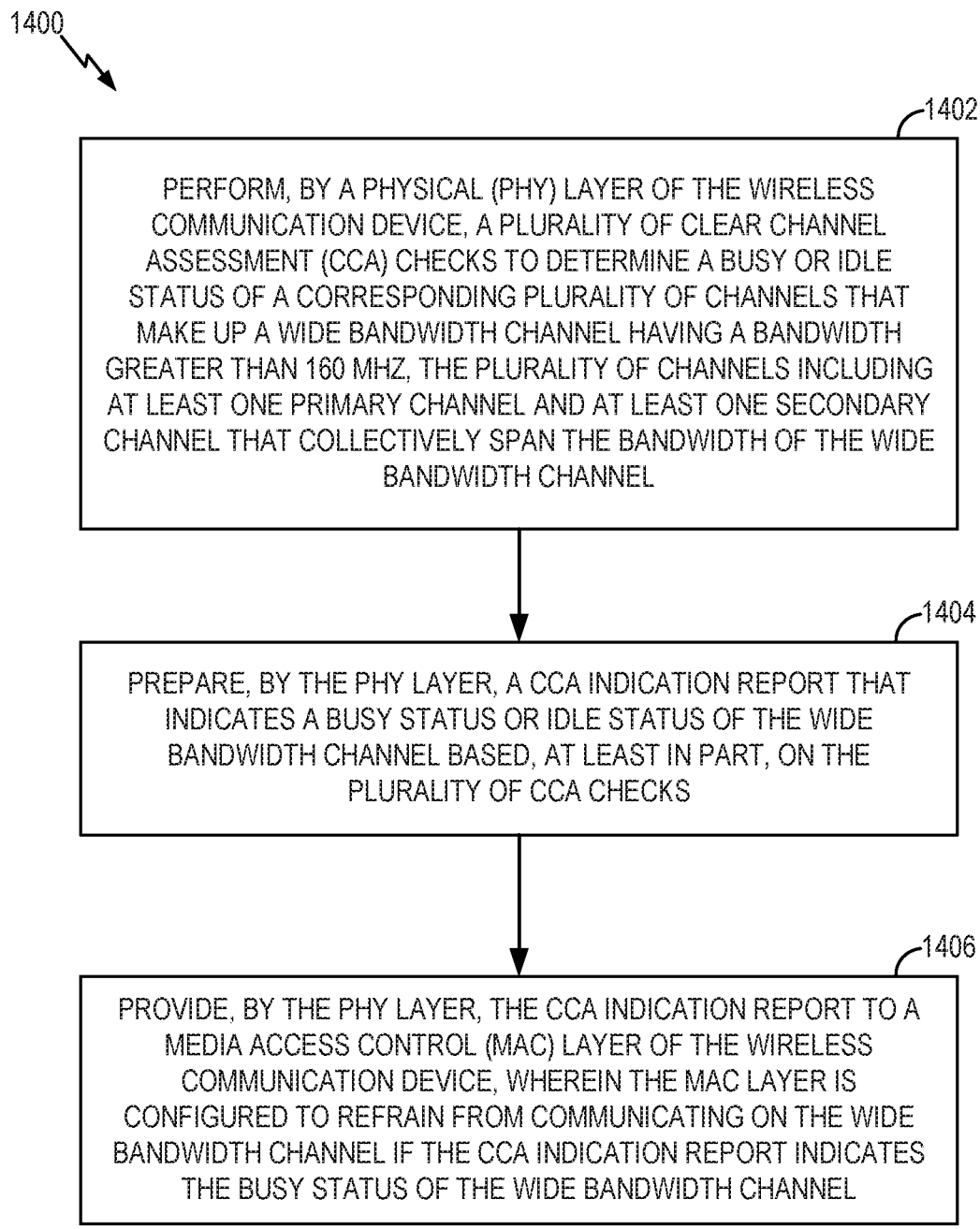
FIG. 14 shows a flowchart illustrating another example process for performing a CCA for a wide bandwidth channel according to some implementations.

FIG. 14 shows a flowchart illustrating another example process 1400 for performing a CCA for a wide bandwidth channel according to some implementations. The process 1400 may be performed by a wireless communication device such as the wireless communication device 500 described above with reference to FIG. 5. In some implementations, the process 1400 may be performed by a wireless communication device operating as or within an AP or STA, such a STA 104, AP 102, AP 602, STA 604, or network interface 305 described above with reference to FIGS. 1, 3, 6A, and 6B, respectively. For example, the process 1400 may be an example implementation of the process 700 described with reference to FIG. 7.

In some implementations, the process 1400 begins in block 1402 with a PHY layer of the wireless communication device performing a plurality of clear channel assessment (CCA) checks to determine a busy or idle status of a corresponding plurality of channels that make up a wide bandwidth channel having a bandwidth greater than 160 MHz. The plurality of channels may include at least one primary channel and at least one secondary channel that collectively span the bandwidth of the wide bandwidth channel.

In block 1404, the process 1400 proceeds with the PHY layer preparing a CCA indication report that indicates a busy status or idle status of the wide bandwidth channel based, at least in part, on the plurality of CCA checks.

In block 1406, the process 1400 proceeds with the PHY layer providing the CCA indication report to a media access control (MAC) layer of the wireless communication device, wherein the MAC layer is configured to refrain from communicating on the wide bandwidth channel if the CCA indication report indicates the busy status of the wide bandwidth channel.

Figure 15:
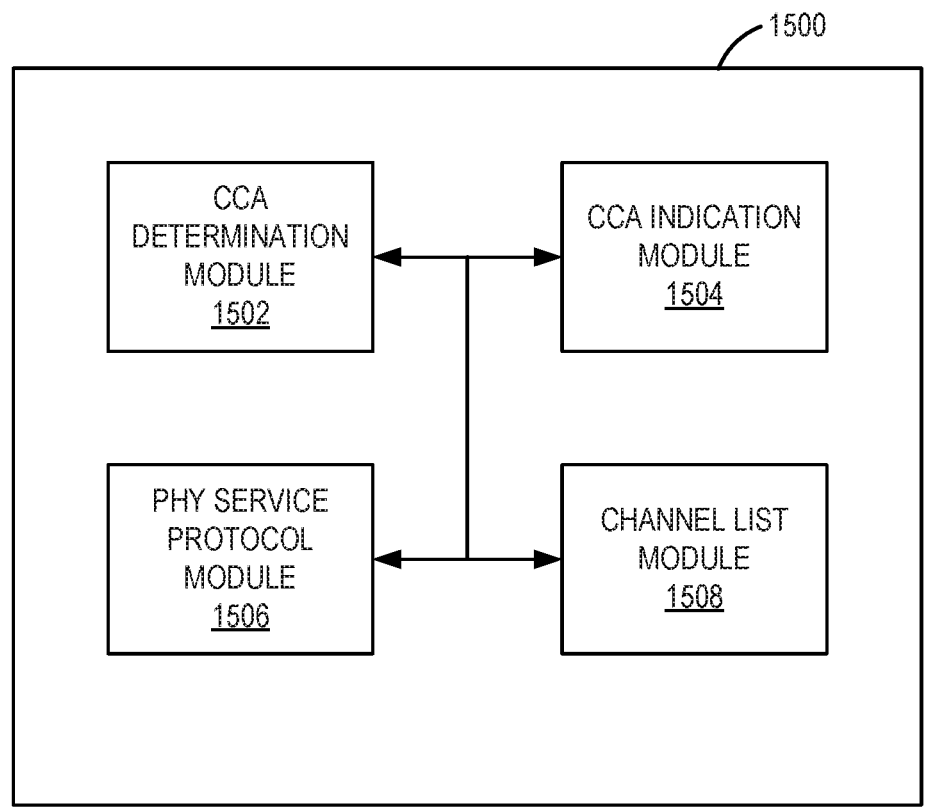
FIG. 15 shows a block diagram of an example wireless communication device for use in wireless communication according to some implementations.

FIG. 15 shows a block diagram of an example wireless communication device 1500 for use in wireless communication according to some implementations. In some implementations, the wireless communication device 1500 is configured to perform one or more of the processes 700, 800, 900, 1000 and 1100 described above with reference to FIGS. 7-11, respectively. In some implementations, the wireless communication device 1500 can be an example of a device for use in a WLAN apparatus such as STA 104, AP 104, AP 500, STA 600, or network interface 300 described above with reference to FIGS. 1, 3, 5, and 6, respectively. For example, the wireless communication device 1500 can be a chip, system on chip (SoC) or chipset that includes one or more modems (for example, a Wi-Fi (IEEE 802.11) modem or a cellular modem). In other instances, the wireless communication device 1500 can be a STA or AP that includes such a chip, SoC or chipset as well as at least one transceiver and at least one antenna.

The wireless communication device 1500 may include CCA determination module 1502, a CCA indication module 1504, a PHY service protocol module 1506, and a channel list module 1508. Portions of one or more of the modules 1502, 1504, 1506, and 1508 may be implemented at least in part in hardware or firmware. For example, the CCA indication module 1504 may be implemented at least in part by one or more modems (for example, a Wi-Fi (IEEE 802.11) modem). In some implementations, at least some of the modules 1502, 1504, 1506, and 1508 are implemented at least in part as software stored in a memory (such as the memory 520 or the memory 620). For example, portions of one or more of the modules 1502, 1504, 1506, and 1508 can be implemented as non-transitory instructions (or "code") executable by at least one processor (such as the processor 510 or the processor 610) to perform the functions or operations of the respective module.

The CCA determination module 1502 may be configured to determine the idle or busy status of at least one primary channel and at least one secondary channel. The determination of the primary channel(s) and secondary channel(s) may be based on the channel list module 1508 breakdown of the wide bandwidth channel.

The CCA indication module 1504 may be configured to prepare the CCA indication to send from the PHY layer to the MAC layer. For example, the CCA indication may include an indicator (such as one of those in FIG. 4).

The PHY service protocol module 1506 may be configured to receive a CCA trigger from the MAC layer and initiate the CCA by the CCA determination module 1502. The PHY service protocol module 1506 also may be configured to provide the CCA indication prepared by the CCA indication module 1504 to the MAC layer. The PHY service protocol module 1506 may implement the cross-layer communication between the MAC layer and the PHY layer.

The channel list module 1508 may be configured to determine the primary channel(s) and the secondary channel(s) associated with the wide bandwidth channel. For example, the channel list module 1508 may determine how to segment the portions of the wide bandwidth channel and then cause the CCA determination module 1502 to perform the CCA for the portions determined by the channel list module 1508.

Another innovative aspect of the subject matter described in this disclosure can be implemented in a method for wireless communication. The method may include performing a clear channel assessment (CCA) of a wide bandwidth channel having a bandwidth greater than 160 MHz. The method may include sending, from a physical (PHY) layer to a media access control (MAC) layer of the wireless communication device, a CCA indication regarding a busy or idle status of the wide bandwidth channel based, at least in part, on the CCA.

Another innovative aspect of the subject matter described in this disclosure can be implemented in a wireless communication device. In some implementations, the wireless communication device includes a processor configured to perform the recited methods.

In some implementations, the methods and wireless communication devices may be configured to divide the wide bandwidth channel into at least one primary channel and at least one secondary channel. Each primary channel may be further divided into a smaller primary channel and a smaller secondary channel until a smallest primary channel has a 20 MHz bandwidth. In some implementations, the methods and wireless communication devices may be configured to determine whether the smallest primary channel is idle based, at least in part, on a first CCA of the smallest primary channel. If the smallest primary channel is idle, the methods and wireless communication devices may be configured to determine, for each secondary channel beginning with the smallest secondary channel, whether the secondary channel is idle based, at least in part, on a further CCA of the secondary channel.

In some implementations, the wide bandwidth channel has a 320 MHz bandwidth and a largest secondary channel has a 160 MHz bandwidth.

In some implementations, the CCA indication may indicate the wide bandwidth channel is busy if any of the first CCA or the further CCAs indicate a detection of a packet having a detection metric greater than detection threshold.

In some implementations, the CCA indication may include an indicator of a busy or idle status of a largest secondary channel of the wide bandwidth channel.

In some implementations, the largest secondary channel may have at least 160 MHz bandwidth.

In some implementations, the detection threshold may be different for each primary channel and secondary channel. The respective packet detection threshold for each primary channel and secondary channel may be based on a bandwidth of the respective primary channel or secondary channel. In some implementations, the methods and wireless communication devices may be configured to detect whether the packet is being transmitted on the respective primary channel or secondary channel based, at least in part, on the respective detection threshold. In some implementations, the methods and wireless communication devices may be configured to determine whether the respective primary channel or secondary channel is idle based on whether the packet is detected.

In some implementations, the detection threshold for each secondary channel may be greater than the packet detection thresholds for the smaller ones of the secondary channels.

In some implementations, the methods and wireless communication devices may be configured to perform a traditional CCA process for a first portion of the bandwidth of the wide bandwidth channel, the first portion including at least one primary channel and at least one secondary channel. In some implementations, the methods and wireless communication devices may be configured to determine a tertiary channel of the wide bandwidth channel having a bandwidth outside of the bandwidth of the first portion, and perform a further CCA process for the tertiary channel.

In some implementations, the first portion may have a 160 MHz bandwidth and wherein the tertiary channel has an 80 MHz bandwidth.

In some implementations, performing the traditional CCA may include performing the traditional CCA process for a secondary channel of the wide bandwidth channel. In some implementations, performing the further CCA process may include performing the further CCA for the tertiary channel uses the same detection threshold as the secondary channel.

In some implementations, the methods and wireless communication devices may be configured to prepare the CCA indication to include a first indicator of a busy or idle state regarding the traditional CCA process. In some implementations, the methods and wireless communication devices may be configured to include a second indicator in the CCA indication of a busy or idle state regarding the tertiary channel.

In some implementations, the methods and wireless communication devices may be configured to determine a quaternary channel of the wide bandwidth channel having a bandwidth outside of the bandwidth of the first portion and the tertiary channel. The methods and wireless communication devices may be configured to perform a further CCA process for the quaternary channel.

In some implementations, the methods and wireless communication devices may be configured to prepare the CCA indication to include a first indicator of a busy or idle state regarding the traditional CCA process. In some implementations, the methods and wireless communication devices may be configured to include a second indicator in the CCA indication of a busy or idle state regarding the tertiary channel. In some implementations, the methods and wireless communication devices may be configured to include a third indicator in the CCA indication of a busy or idle state regarding the quaternary channel.

In some implementations, the methods and wireless communication devices may be configured to perform the further CCA processes for the tertiary and quaternary channel concurrently.

In some implementations, the methods and wireless communication devices may be configured to perform a traditional CCA process for a first portion of the bandwidth of the wide bandwidth channel up to a first 80 MHz portion of the wide bandwidth channel. In some implementations, the methods and wireless communication devices may be configured to concurrently perform further CCA processes for each remaining 80 MHz portion of the wide bandwidth channel. In some implementations, the CCA indication may include indicators for the traditional CCA process and each of the further CCA processes.

In some implementations, the methods and wireless communication devices may be configured to perform a plurality of subchannel CCAs for multiple portions of a secondary channel of the wide bandwidth channel, and send the CCA indication with indicators regarding each of the plurality of subchannel CCAs.

In some implementations, the CCA indication includes at least one indicator regarding a first subchannel CCA for a secondary channel that has a 160 MHz bandwidth.

In some implementations, the plurality of subchannel CCAs may include subchannel CCAs for each 20 MHz portion of the secondary channels of the wide bandwidth channel.

In some implementations, the plurality of subchannel CCAs may include subchannel CCAs for each 20 MHz portion of the secondary channel. In some implementations, each secondary channel size may have a bandwidth that is less than or equal to 80 MHz bandwidth.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
    performing, by a physical (PHY) layer of the wireless communication device, a plurality of clear channel assessment (CCA) checks to detect energy of a plurality of 20 MHz channels that collectively span a bandwidth of a wide bandwidth channel; and
    providing, by the PHY layer to a media access control (MAC) layer of the wireless communication device, a CCA indication report based, at least in part, on the plurality of CCA checks, wherein the CCA indication report indicates a channel busy status or channel idle status of the wide bandwidth channel based, at least in part, on the energy of the plurality of 20 MHz channels and a signal detection threshold, wherein the CCA indication report further includes a plurality of CCA indications indicating a per 20 MHz busy or a per 20 MHz idle status corresponding to each of the plurality of 20 MHz channels based, at least in part, on the energy of the plurality of 20 MHz channels and a packet detection threshold.

2. The method of claim 1, further comprising segmenting the wide bandwidth channel into a primary 20 MHz bandwidth channel, a secondary 20 MHz bandwidth channel, a secondary 40 MHz bandwidth channel, a secondary 80 MHz bandwidth channel, a tertiary 80 MHz bandwidth channel and a quaternary 80 MHz bandwidth channel, wherein performing the plurality of CCA checks includes performing CCA checks on the primary 20 MHz bandwidth channel, the secondary 20 MHz bandwidth channel, the secondary 40 MHz bandwidth channel, the secondary 80 MHz bandwidth channel, the tertiary 80 MHz bandwidth channel and the quaternary 80 MHz bandwidth channel.

3. The method of claim 2,
wherein the plurality of CCA checks are performed sequentially on the primary 20 MHz bandwidth channel, the secondary 20 MHz bandwidth channel, the secondary 40 MHz bandwidth channel and concurrently performing CCA checks on the secondary 80 MHz bandwidth channel, the tertiary 80 MHz bandwidth channel and the quaternary 80 MHz bandwidth channel; and
wherein the CCA indication report includes the channel busy status based on a first busy instance in the primary 20 MHz bandwidth channel, the secondary 20 MHz bandwidth channel, the secondary 40 MHz bandwidth channel, the secondary 80 MHz bandwidth channel, the tertiary 80 MHz bandwidth channel or the quaternary 80 MHz bandwidth channel.

4. The method of claim 1,
segment the wide bandwidth channel into a plurality of channels, wherein the plurality of channels includes a primary 20 MHz bandwidth channel, a secondary 20 MHz bandwidth channel, a secondary 40 MHz bandwidth channel, a secondary 80 MHz bandwidth channel, and a secondary 160 MHz bandwidth channel; and
wherein performing the plurality of CCA checks includes:
    performing CCA checks for each 20 MHz bandwidth of the primary 20 MHz bandwidth channel, the secondary 20 MHz bandwidth channel, the secondary 40 MHz bandwidth channel, the secondary 80 MHz bandwidth channel, and the secondary 160 MHz bandwidth channel;
    performing CCA checks for each 40 MHz bandwidth of the secondary 40 MHz bandwidth channel, the secondary 80 MHz bandwidth channel, and the secondary 160 MHz bandwidth channel;
    performing CCA checks for each 80 MHz bandwidth of the secondary 80 MHz bandwidth channel and the secondary 160 MHz bandwidth channel; and
    performing a CCA check for each 160 MHz bandwidth of the secondary 160 MHz bandwidth channel.

5. The method of claim 1,
segment the wide bandwidth channel into a plurality of channels, wherein the plurality of channels includes a primary 20 MHz bandwidth channel, a secondary 20 MHz bandwidth channel, a secondary 40 MHz bandwidth channel, a secondary 80 MHz bandwidth channel, a tertiary 80 MHz bandwidth channel, and a quaternary 80 MHz bandwidth channel; and
wherein performing the plurality of CCA checks includes:
    performing CCA checks for each 20 MHz bandwidth of the primary 20 MHz bandwidth channel, the secondary 20 MHz bandwidth channel, the secondary 40 MHz bandwidth channel, and the secondary 80 MHz bandwidth channel;
    performing CCA checks for each 40 MHz bandwidth of the secondary 40 MHz bandwidth channel and the secondary 80 MHz bandwidth channel; and
    performing CCA checks for each 80 MHz bandwidth of the secondary 80 MHz bandwidth channel; and
    performing a CCA check for each 20 MHz, 40 MHz and 80 MHz bandwidth of the tertiary 80 MHz bandwidth channel and the quaternary 80 MHz bandwidth channel.

6. The method of claim 1,
segment the wide bandwidth channel into a plurality of channels, wherein the plurality of channels includes a primary 160 MHz bandwidth channel and a secondary 160 MHz bandwidth channel; and
wherein performing the plurality of CCA checks includes:
    performing CCA checks for each 20 MHz bandwidth of the primary 160 MHz bandwidth channel; and
    performing CCA checks for each 80 MHz bandwidth of the secondary 160 MHz bandwidth channel.

7. The method of claim 1, wherein performing the plurality of CCA checks includes:
    segmenting the wide bandwidth channel into a primary channel and a secondary channel;
    recursively segmenting the primary channel into a smaller primary channel and a smaller secondary channel until a smallest primary channel has a 20 MHz bandwidth; and
    performing CCA checks on each primary channel and each secondary channel.

8. The method of claim 1, wherein performing the plurality of CCA checks includes:
    performing CCA checks for a first portion of the wide bandwidth channel, the first portion including up to 160 MHz bandwidth of the wide bandwidth channel;
    determining a tertiary channel of the wide bandwidth channel within a second portion of the wide bandwidth channel; and
    performing one or more further CCA checks for the tertiary channel.

9. The method of claim 8, wherein performing the plurality of CCA checks further includes:
    determining a quaternary channel, different from the tertiary channel, of the wide bandwidth channel within the second portion; and
    performing one or more further CCA checks for the quaternary channel.

10. The method of claim 9, wherein performing the plurality of CCA checks further includes concurrently performing the one or more further CCA checks for the tertiary channel and the quaternary channel.

11. A wireless communication device comprising:
    at least one modem configured to establish a communication association on a wide bandwidth channel;
    at least one processor communicatively coupled with the at least one modem,
    the at least one processor in conjunction with the at least one modem, being configured to:
        perform, by a physical (PHY) layer of the wireless communication device, a plurality of clear channel assessment (CCA) checks to detect energy of a plurality of 20 MHz that collectively span a bandwidth of the wide bandwidth channel; and
        provide, by the PHY layer to a media access control (MAC) layer of the wireless communication device, a CCA indication report based, at least in part, on the plurality of CCA checks, wherein the CCA indication report indicates a channel busy status or channel idle status of the wide bandwidth channel based, at least in part, on the energy of the plurality of 20 MHz channels and a signal detection threshold, wherein the CCA indication report further includes a plurality of CCA indications indicating a per 20 MHz busy or a per 20 MHz idle status corresponding to each of the plurality of 20 MHz channels based, at least in part, on the energy of the plurality of 20 MHz channels and a packet detection threshold.

12. The wireless communication device of claim 11, wherein the at least one processor, in conjunction with the at least one modem, is further configured to:
   segment the wide bandwidth channel into a plurality of channels, wherein the plurality of channels includes a primary 20 MHz bandwidth channel, a secondary 20 MHz bandwidth channel, a secondary 40 MHz bandwidth channel, a secondary 80 MHz bandwidth channel, a tertiary 80 MHz bandwidth channel and a quaternary 80 MHz bandwidth channel, and
   perform CCA checks on the primary 20 MHz bandwidth channel, the secondary 20 MHz bandwidth channel, the secondary 40 MHz bandwidth channel, the secondary 80 MHz bandwidth channel, the tertiary 80 MHz bandwidth channel and the quaternary 80 MHz bandwidth channel.

13. The wireless communication device of claim 11, wherein the at least one processor, in conjunction with the at least one modem, is further configured to:
   segment the wide bandwidth channel into a plurality of channels, wherein the plurality of channels includes a primary 160 MHz bandwidth channel and a secondary 160 MHz bandwidth channel;
   perform CCA checks for each 20 MHz bandwidth of the primary 160 MHz bandwidth channel; and
   perform CCA checks for each 80 MHz bandwidth of the secondary 160 MHz bandwidth channel.

14. The wireless communication device of claim 11, wherein the at least one processor, in conjunction with the at least one modem, is further configured to:
   segment the wide bandwidth channel into a first half portion and a second half portion;
   segment the first half portion of the wide bandwidth channel into a first plurality of channels, wherein the first plurality of channels includes a primary 20 MHz bandwidth channel, a secondary 20 MHz bandwidth channel, a secondary 40 MHz bandwidth channel, a secondary 80 MHz bandwidth channel;
   segment the second half portion of the wide bandwidth channel into a second plurality of channels, wherein the second plurality of channels includes a primary 20 MHz bandwidth channel, a secondary 20 MHz bandwidth channel, a secondary 40 MHz bandwidth channel, a secondary 80 MHz bandwidth channel; and
   perform CCA checks for each of the first plurality of channels and the second plurality of channels.

15. The wireless communication device of claim 11, wherein the at least one processor, in conjunction with the at least one modem, is further configured to:
   perform CCA checks for a first portion of the wide bandwidth channel, the first portion including up to 160 MHz bandwidth of the wide bandwidth channel;
   determine a tertiary channel of the wide bandwidth channel within a second portion of the wide bandwidth channel; and
   perform one or more further CCA checks for the tertiary channel.

16. The wireless communication device of claim 15, wherein the at least one processor, in conjunction with the at least one modem, is further configured to:
   determine a quaternary channel, different from the tertiary channel, of the wide bandwidth channel within the second portion; and
   perform one or more further CCA checks for the quaternary channel.

17. The wireless communication device of claim 16, wherein the at least one processor, in conjunction with the at least one modem, is further configured to concurrently perform the one or more further CCA checks for the tertiary channel and the quaternary channel.

18. The wireless communication device of claim 11, further comprising:
   at least one antenna coupled to the at least one modem to wirelessly transmit signals output from the at least one modem and to wirelessly receive signals for input into the at least one modem; and
   a housing that encompasses the at least one modem, the at least one processor, and at least a portion of the at least one antenna.

19. A system for wireless communication comprising:
   means for performing, by a physical (PHY) layer of a wireless communication device, a plurality of clear channel assessment (CCA) checks to detect energy of a plurality of 20 MHz channels that collectively span a bandwidth of a wide bandwidth channel; and
   means for providing, by the PHY layer to a media access control (MAC) layer of the wireless communication device, a CCA indication report based, at least in part, on the plurality of CCA checks, wherein the CCA indication report indicates a channel busy status or channel idle status of the wide bandwidth channel based, at least in part, on the energy of the plurality of 20 MHz channels and a signal detection threshold, wherein the CCA indication report further includes a plurality of CCA indications indicating a per 20 MHz busy or a per 20 MHz idle status corresponding to each of the plurality of 20 MHz channels based, at least in part, on the energy of the plurality of 20 MHz channels and a packet detection threshold.

20. The method of claim 1, wherein the signal detection threshold is −62 dBm to detect a signal in any of the plurality of 20 MHz channels, and wherein the packet detection threshold is −72 dBm to detect part of a wireless local area network (WLAN) packet in any of the plurality of 20 MHz channels.

21. The method of claim 1, wherein the MAC layer is configured to refrain from communicating on the wide bandwidth channel when the CCA indication report indicates the channel busy status of the wide bandwidth channel.

22. The method of claim 1, wherein the MAC layer is configured to determine channel puncturing on the wide bandwidth channel based on the CCA indications when the CCA indication report indicates the channel idle status of the wide bandwidth channel.

* * * * *